United States Patent
Gibby et al.

(10) Patent No.: US 11,948,265 B2
(45) Date of Patent: Apr. 2, 2024

(54) IMAGE DATA SET ALIGNMENT FOR AN AR HEADSET USING ANATOMIC STRUCTURES AND DATA FITTING

(71) Applicant: Novarad Corporation, American Fork, UT (US)

(72) Inventors: Wendell Arlen Gibby, Mapleton, UT (US); Steven Todd Cvetko, Draper, UT (US)

(73) Assignee: Novarad Corporation, Provo, UT (US)

( * ) Notice: Subject to any disclaimer, the term of this patent is extended or adjusted under 35 U.S.C. 154(b) by 0 days.

(21) Appl. No.: 17/536,009

(22) Filed: Nov. 27, 2021

(65) Prior Publication Data

US 2023/0169740 A1    Jun. 1, 2023

(51) Int. Cl.
| | |
|---|---|
| G06T 19/20 | (2011.01) |
| G02B 27/01 | (2006.01) |
| G06T 7/00 | (2017.01) |
| G06T 19/00 | (2011.01) |

(52) U.S. Cl.
CPC .............. *G06T 19/20* (2013.01); *G02B 27/01* (2013.01); *G06T 7/0012* (2013.01); *G06T 19/006* (2013.01); *G02B 2027/0198* (2013.01); *G06T 2207/10081* (2013.01); *G06T 2219/2004* (2013.01)

(58) Field of Classification Search
None
See application file for complete search history.

(56) References Cited

U.S. PATENT DOCUMENTS

| | | | |
|---|---|---|---|
| 6,147,678 A | 11/2000 | Kumar et al. | |
| 9,119,655 B2 | 9/2015 | Bowling et al. | |
| 9,128,909 B2 | 9/2015 | Brindley | |
| 9,161,824 B2 | 10/2015 | Chishti et al. | |

(Continued)

FOREIGN PATENT DOCUMENTS

| | | |
|---|---|---|
| JP | 2014-131552 | 7/2014 |
| JP | 2017-146758 | 8/2017 |

(Continued)

OTHER PUBLICATIONS

Peters, T.M.: Image-guidance for surgical procedures. Phys. Med. Biol. 51 (14), R505-R540 (2006), 37 pages.

(Continued)

*Primary Examiner* — Tapas Mazumder
(74) *Attorney, Agent, or Firm* — Thorpe North & Western LLP

(57) ABSTRACT

A technology is described for aligning an image data set with a patient using an augmented reality (AR) headset. A method may include obtaining an image data set representing an anatomical structure of a patient. A two-dimensional (2D) X-ray generated image of at least a portion of the anatomical structure of the patient in the image data set and a visible marker may be obtained. The image data set can be aligned to the X-ray generated image by using data fitting. A location of the visible marker may be defined in the image data set using alignment with the X-ray generated image. The image data set may be aligned with a body of the patient, using the visible marker in the image data set as referenced to the visible marker seen on the patient through the AR headset.

32 Claims, 15 Drawing Sheets

(56) References Cited

U.S. PATENT DOCUMENTS

| | | |
|---|---|---|
| 9,572,516 B1 | 2/2017 | Sheikh |
| 9,589,348 B1 | 3/2017 | Linde |
| 10,929,670 B1 | 2/2021 | Troy et al. |
| 11,172,996 B1 | 11/2021 | Qian et al. |
| 11,287,874 B2 | 3/2022 | Gibby et al. |
| 2005/0259882 A1 | 11/2005 | Dewaele |
| 2005/0262031 A1 | 11/2005 | Saidi et al. |
| 2006/0152434 A1 | 7/2006 | Sauer et al. |
| 2007/0066881 A1 | 3/2007 | Edwards et al. |
| 2007/0090197 A1 | 4/2007 | Senda |
| 2008/0208041 A1 | 8/2008 | Gilboa |
| 2009/0078772 A1 | 3/2009 | Ofek et al. |
| 2009/0278915 A1 | 11/2009 | Kramer et al. |
| 2010/0049548 A1 | 2/2010 | Kubota |
| 2010/0099980 A1 | 4/2010 | Godara et al. |
| 2010/0215213 A1 | 8/2010 | Mielekamp et al. |
| 2011/0105895 A1 | 5/2011 | Kornblau et al. |
| 2011/0268248 A1 | 11/2011 | Simon et al. |
| 2012/0078236 A1 | 3/2012 | Schoepp |
| 2013/0197354 A1 | 8/2013 | Maschke et al. |
| 2014/0062900 A1 | 3/2014 | Kaula et al. |
| 2014/0210856 A1 | 7/2014 | Finn et al. |
| 2014/0275760 A1 | 9/2014 | Lee et al. |
| 2014/0355840 A1 | 12/2014 | Pearson Peyton |
| 2015/0161802 A1 | 6/2015 | Christiansen |
| 2015/0173715 A1 | 6/2015 | Raghavan et al. |
| 2016/0035139 A1 | 2/2016 | Fuchs et al. |
| 2016/0143699 A1 | 5/2016 | Tanji |
| 2016/0166333 A1 | 6/2016 | Wang et al. |
| 2016/0180441 A1 | 6/2016 | Hasan et al. |
| 2016/0220393 A1 | 8/2016 | Slivka et al. |
| 2016/0270853 A1 | 9/2016 | Lavallee et al. |
| 2016/0259428 A1 | 10/2016 | Dyba et al. |
| 2017/0045938 A1 | 2/2017 | Aoyama et al. |
| 2017/0071686 A1 | 3/2017 | Birkenbach et al. |
| 2017/0116729 A1 | 4/2017 | Stolka et al. |
| 2017/0165008 A1 | 6/2017 | Finley |
| 2017/0178540 A1 | 6/2017 | Rios et al. |
| 2017/0273654 A1* | 9/2017 | Taguchi ................. A61B 6/035 |
| 2017/0296292 A1 | 10/2017 | Mahmood et al. |
| 2017/0368369 A1 | 12/2017 | Heinrich et al. |
| 2018/0064410 A1* | 3/2018 | Li ........................ A61B 6/582 |
| 2018/0092698 A1 | 4/2018 | Chopra et al. |
| 2018/0177403 A1 | 6/2018 | Kim-Whitty |
| 2018/0247128 A1 | 8/2018 | Alvi et al. |
| 2018/0303558 A1 | 10/2018 | Thomas |
| 2018/0322702 A1 | 11/2018 | Djajadiningrat |
| 2019/0108645 A1 | 4/2019 | Ben-Yishai |
| 2019/0209080 A1 | 7/2019 | Gullotti et al. |
| 2019/0310819 A1 | 10/2019 | Xu et al. |
| 2019/0328462 A1 | 10/2019 | Liu et al. |
| 2019/0348169 A1* | 11/2019 | Gibby .................... G16H 30/40 |
| 2019/0380792 A1 | 12/2019 | Poltaretskyi et al. |
| 2020/0138518 A1 | 5/2020 | Lang |
| 2020/0145495 A1 | 5/2020 | Coffey et al. |
| 2020/0159313 A1* | 5/2020 | Gibby ...................... G06T 7/33 |
| 2020/0186786 A1 | 6/2020 | Gibby et al. |
| 2020/0188030 A1 | 6/2020 | Kopper et al. |
| 2020/0197107 A1 | 6/2020 | Ryan et al. |
| 2020/0405395 A1 | 12/2020 | Gullotti et al. |
| 2021/0045838 A1 | 2/2021 | Bradbury et al. |
| 2021/0049921 A1 | 2/2021 | Welch et al. |
| 2021/0186355 A1 | 6/2021 | Ben-Yishai et al. |
| 2022/0130116 A1 | 4/2022 | McCall |
| 2022/0151705 A1 | 5/2022 | Nikou et al. |
| 2022/0202493 A1 | 6/2022 | Gibby et al. |
| 2022/0287676 A1 | 9/2022 | Steines et al. |
| 2022/0291741 A1 | 9/2022 | Gibby et al. |
| 2023/0072188 A1 | 3/2023 | Gibby et al. |
| 2023/0169740 A1 | 6/2023 | Gibby et al. |

FOREIGN PATENT DOCUMENTS

| | | | |
|---|---|---|---|
| WO | WO 2014/200016 | 12/2014 | |
| WO | WO 2014200016 | 12/2014 | |
| WO | WO 2018/132804 | 7/2018 | |
| WO | WO 2018/134140 | 7/2018 | |
| WO | WO 2019/238209 | 12/2019 | |
| WO | WO 2020123702 | 6/2020 | |
| WO | WO-2020123702 A1 * | 6/2020 | ............. A61B 34/10 |

OTHER PUBLICATIONS

Fabrizio Cutolo, Augmented Reality in Image-Guided Surgery, Nov. 2017, 12 pages.

"QR code tracking," Microsoft Hololens Documentation, obtained at https://docs.microsoft.com/en-us/windows/mixed-reality/qr-code-tracking, Oct. 18, 2021.

Microsoft Hololens for Developers, Full Document, Microsoft Hololens Documentation, obtained at https://docs.microsoft.com/en-us/windows/mixed-reality/qr-code-tracking, Oct. 18, 2021.

* cited by examiner

US 11,948,265 B2

IMAGE DATA SET ALIGNMENT FOR AN AR HEADSET USING ANATOMIC STRUCTURES AND DATA FITTING

BACKGROUND

Mixed or augmented reality is an area of computing technology where images from the physical world and virtual computing worlds may be combined into a mixed reality world. In mixed reality, people, places, and objects from the physical world and virtual worlds become a blended environment. A mixed reality experience may be provided through existing commercial or custom software along with the use of VR (virtual reality) or AR (augmented reality) headsets. Augmented reality (AR) is an example of mixed reality where a live direct view (or an indirect view) of a physical, real-world environment is augmented or supplemented by computer-generated sensory input such as sound, video, computer graphics or other data. Augmentation is performed as a real-world location is viewed and in context with environmental elements. With the help of AR sensor technology (e.g. adding computer vision and object recognition) the information about the surrounding real world of the user may become interactive and may be digitally modified.

An issue faced by AR systems or AR headsets is identifying a position and orientation of an object with a high degree of precision. Similarly aligning the position of a virtual element or virtual object with a live view of a real-world environment may be challenging. The alignment resolution of an AR headset may be able to align a virtual object to a physical object being viewed, but the alignment resolution may only be aligned to within a few centimeters. Providing alignment to within a few centimeters may be useful for entertainment and less demanding applications but greater positioning and alignment resolution for AR systems may be desired in the scientific, engineering and medical disciplines. As a result, positioning and alignment processes may be done manually which can be time consuming, cumbersome, and inaccurate.

DETAILED DESCRIPTION

Figure 1A:
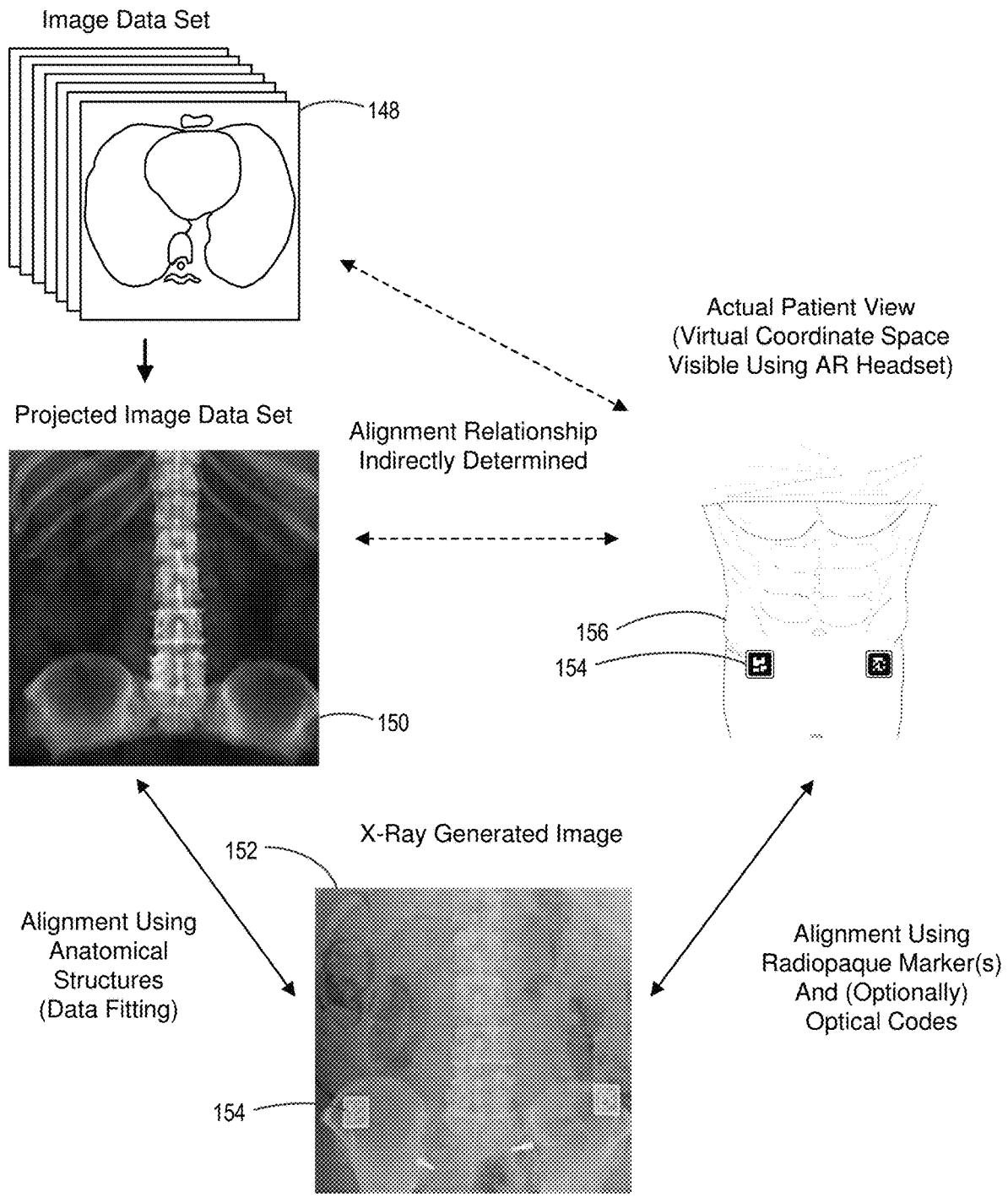
FIG. 1A illustrates an example of a technology for aligning an image data set with a body of a person using an x-ray generated image with an image visible marker and alignment of anatomical structures.

A technology is provided for using an augmented reality (AR) headset to enable one or more visible markers to be identified in an X-ray generated image of a patient and to be used for alignment of an image data set with a body of a person in a 3D coordinate system of the AR headset during a medical procedure. The visible markers may have two separate aspects: 1) the visible marker may be visible in an x-ray generated image, and 2) the visible marker may be optically visible to and registerable by an optical camera of an AR headset (or using infrared). An image visible marker is an example of aspect of the visible marker that can be seen in non-optical imaging modalities. In one configuration, the image visible markers may each include an optical code formed into the image visible marker (e.g., radiopaque material, metal, or titanium shapes with optical codes). In another configuration, the image visible markers may be shaped radiopaque materials (e.g., a radiopaque pattern, a metal ball, a radiopaque cross, etc.) but the image visible markers may not have an optical code formed into the image visible markers (e.g., the image visible marker is a blank shape with no codes or characters). FIG. 1 illustrates that a projected image data set 150 may be created using an image data set 148 captured by a medical imaging device. The projected image data set 150 may be a MIP (maximum intensity projection). In addition, the projected image data set 150 may be first aligned with an X-ray generated image 152 using a shared anatomical structure and data fitting, and the X-ray generated image 152 may include one or more image visible markers 154 or image visible markers with optical codes. The image data set 148 may receive the image visible marker that is copied from the X-ray generated image 152. Alternatively, the image data set 148 may be fused together with the X-ray generated image 152 and the image visible marker location is then known in both the X-ray generated image 152 and the image data set 148. In yet another option, the image visible marker location from the x-ray generated image(s) 152 may simply be correlated to or referenced to the image data set 148 by computing and storing the location of the image visible marker using the x-ray generated image and the visible markers or optical codes seen on the patient. Then the image data set 148 may be aligned with a body of a person 156 using one or more image visible markers 154 or image visible markers 154 with optical codes on the body of the person.

The image data set 148 may be a previously acquired image of a portion of body of a person using a non-optical imaging modality (e.g., using MRI (magnetic resonance imaging), CT (computed tomography) scanning, X-ray, etc.). The image data set 148 can be aligned to the body of the person 156 using an image visible marker 154 or image visible marker with an optical code that is located on the body of the person. In one example configuration, an image visible marker 154 may have an optical code formed into or embossed on the image visible marker. More specifically, a titanium shape (e.g., a square) may have an optical code etched, embossed or cast in the metal of the titanium shape. In another example, an image visible marker 154 and an optical code (e.g., an AprilTag or 2D optical bar code) may both be formed into a non-metal radiopaque material to facilitate the alignment of the image data set 148 with the body of the person 156. Accordingly, the alignment relationship between the image data set 148 and the body of the person 156 can be indirectly determined through the X-ray generated image 152 that has the image visible marker and the image visible maker viewable on the body of the person through the AR headset. This alignment can take place even though the image data set 148 initially has no image visible marker in the image data set.

An image visible marker is a marker that can be viewed in a non-visible imaging modality, such as a captured radiology image or an image data set, which may or may not be optically visible to the AR headset. The image data set may capture structures of the human body with a non-optical imaging modality. An image visible marker in the image data set may be used to align the image data set with an image visible marker or image visible marker with an optical code on the body of the patient, which is visible through the AR headset. The image visible markers in the image data set may have been obtained from an X-ray generated image that has a blank image visible marker or an image visible marker with an optical code formed into the radiopaque marker. In some examples, the image visible marker may be a radiopaque marker or an MIll bead, etc. The optical codes that may be optionally formed into the image visible marker may increase the recognition and registration capabilities of the image visible marker as detected on the body of the patient using the AR headset and increase the ability to detect the location of the image visible marker in the X-ray and/or image data set.

In another configuration of the technology, an augmented reality (AR) headset or an AR display can align and display an X-ray generated image and an image projection from an image data set with respect to a body of a person. A position and orientation of the X-ray generated image and an image projection may be defined by a position and orientation of a fluoroscopic device which is mobile with respect to the body of the person. The mobile imaging device may have a medical professional change the imaging device's orientation or move emitters, detectors, transducers, and/or imaging components of the imaging device with respect to the body of the person. One or more optical codes on the fluoroscopic device can be used to determine the position and orientation of the fluoroscopic device with respect to the body of the person or patient. The X-ray generated image and the image projection may be aligned using shared anatomical structure and data fitting (as described above and also described later in this description) and displayed through the AR headset with the portion of the body of the person being viewed through the AR headset and fluoroscopically imaged. This alignment and display can use one or more image visible markers or image visible markers with optical codes on the body of the person and one or more optical codes on the fluoroscopic device. Image visible markers or image visible markers with optical codes on the body of the person and the optical codes on the fluoroscopic device can be identified in data (e.g., visual or IR data) captured by a sensor of an AR headset.

In one example configuration, the image visible markers with the optical codes on the body of the person can have the optical codes formed into image visible marker. For example, the optical code may be combined with or coincident with an image visible marker. Further, the optical code may be engraved or cut into the image visible marker that is metal or a radiopaque material. This allows an image data set (e.g., a radiology image) to be aligned to the body of the person using an image visible marker with an optical code on the body of the person, as viewed through an AR display (e.g., an AR headset).

An image projection may be created from the image data set based on the position and orientation of the fluoroscopic device. An X-ray generated image from the fluoroscopic device and/or the image projection may be aligned with the body of the person based on the image visible marker (e.g., a radiopaque object) or image visible marker with an optical code and/or the one or more optical codes defining the position and orientation of the fluoroscopic device. Further, the X-ray generated image may be virtually displayed in an AR headset in a location with respect to a body of a person where the X-ray beam is passing through the body of the person and the X-ray generated image may be aligned to overlay the portion of the body of the person being imaged with the X-ray beam. The image projection may be oriented parallel to the X-ray generated image (i.e., perpendicular to the X-ray beam) and may be displayed in the AR headset as virtually being in at least part of a path of an X-ray beam. The aligned images may be displayed using the AR headset along with the real world or real view of the patient or the aligned images may be displayed on a separate AR display (e.g., a separate display screen). This process allows live x-ray generated images, image data sets (e.g., augmented reality image or the image projection), and an actual view of a person to be combined, positioned, and oriented so that useful aspects of the x-ray generated images (e.g., guiding of radiopaque object within a body of a person) and the image data set (e.g., better tissue contrast, etc.) are combined during a medical procedure.

In another configuration using x-ray generated images, a change in the position and orientation of a fluoroscopic device can be detected with respect to the body of the person using one or more optical codes on the fluoroscopic device.

Then the image projection and x-ray generated image position and orientation may be modified as defined by the change in position and orientation of the fluoroscopic device. For example, movement of the projection of the image data set may be co-localized and/or synchronized to match the x-ray generated image based on a change in orientation and position of the fluoroscope device. The zooming of the fluoroscopic device may also be detected using a radiopaque object on a body of a person, and the size of the radiopaque object may be used to adjust a size of the image projection as viewed on an AR display.

Figure 1B:
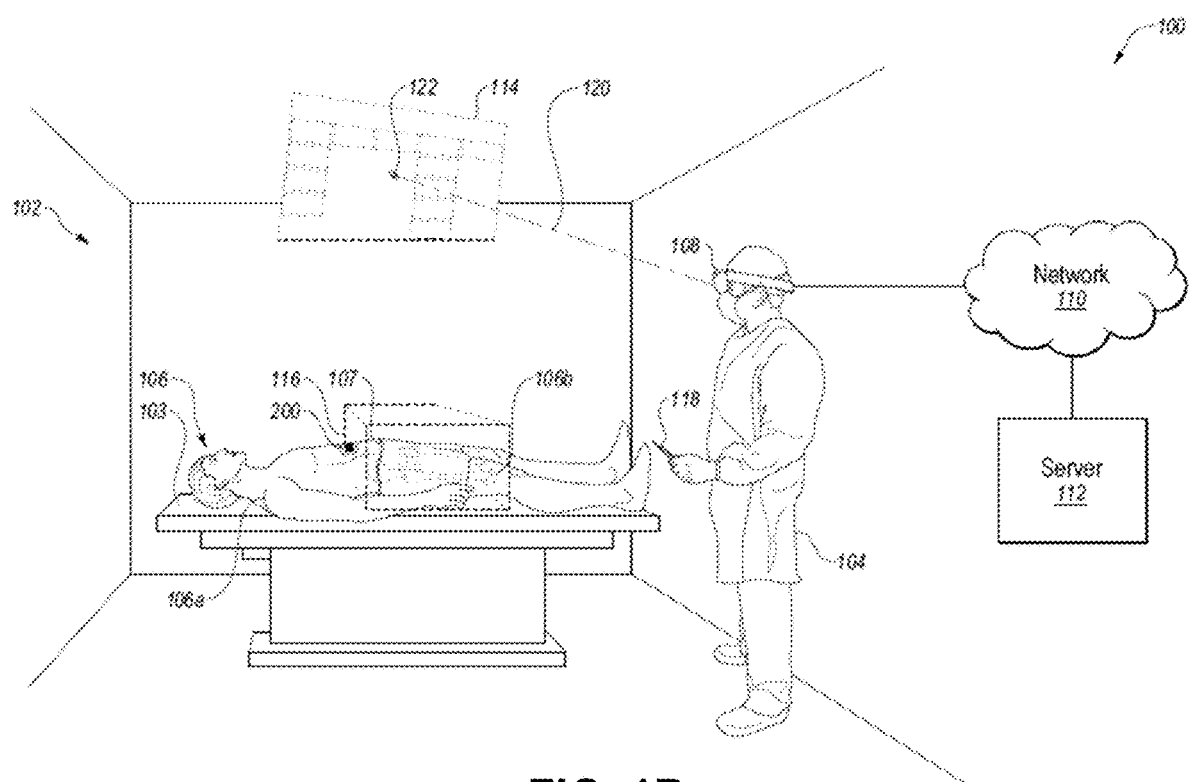
FIG. 1B illustrates an example augmented reality (AR) environment in which an image data set of a patient may be aligned to actual views of the patient using one or more image visible markers or image visible markers with optical codes attached to the patient.

FIG. 1B illustrates an example augmented reality (AR) environment 100 in which an image data set 116 of a patient 106 or person may be aligned with actual views of the patient 106 using an image visible marker or image visible marker with an optical code, which is affixed to the patient 106. The environment 100 may include a physical space 102 (e.g., operating theater, a lab, etc.), a user 104, the patient 106, one or more image visible markers or image visible markers with optical codes 200 on the patient, a medical implement 118, and an AR headset 108 in communication with a server 112 over a computer network 110. A virtual user interface 114 and a virtual cursor 122 are also shown in dashed lines to indicate that these virtual elements are generated by the AR headset 108 and are viewable by the user 104 through the AR headset 108.

The AR headset 108 may be an AR computing system that is capable of augmenting actual views of the patient 106 with an image data set 116 or an image projection of an image data set 116. For example, the AR headset 108 may be employed by the user 104 in order to augment actual views of the patient 106 with one or more 3D image data set views or radiologic images of the patient 106 including, but not limited to, bones 106b (as illustrated in FIG. 1), muscles, organs, tissues or fluids. The AR headset 108 may allow an image data set 116 (or a projection of the image data set) to be dynamically reconstructed. As the user 104 moves around the patient 106, the sensors of the AR headset 108 may determine the location of the user 104 relative to the patient 106, and the internal anatomy of the patient displayed using the image data set 116 can be reconstructed dynamically as the user chooses different orientations relative to the patient. For example, the user 104 may walk around the patient 106. Then the AR headset 108 may augment actual views of the patient 106 with one or more acquired radiology images or image data sets (MRI, CT scan, etc.) of the patient 106, so that both the patient 106 and the image data set 116 of the patient 106 may be viewed by the user 104 from any angle (e.g., a projected image or a slice from the image data set 116 may also be displayed). The AR headset 108 may be a modified version of the Microsoft HOLOLENS, Meta Company META 2, Epson MOVERIO, Garmin VARIA VISION or other AR headsets.

The image visible markers or image visible markers with their respective optical code(s) 200 may be affixed to the patient 106 after the generation of image data of the patient 106 (e.g., capture of the MRI, CT scan, X-ray, etc.), but may be affixed to the patient 106 immediately prior to or while the patient 106 is being viewed by the user 104 through the AR headset 108. Then, the image visible marker or image visible marker with the optical code 200 may be employed by the AR headset 108 to automatically align the image data set 116 of the patient 106 with actual views of the patient 106, as described in more detail later. Further, the image visible marker or image visible marker with the optical code 200 may have embedded information to automatically retrieve the image data set 116 and ensure that the image data set 116 retrieved by the AR headset 108 matches the actual patient 106 being viewed through the AR headset 108.

A virtual user interface 114 may be generated by the AR headset 108 and may include options for altering the display of the projected inner anatomy of the patient 106 from the image data set 116 of the patient 106. The virtual user interface 114 may include other information that may be useful to the user 104. For example, the virtual user interface 114 may include information about the patient or medical implements 118 (e.g., medical instruments, implants, etc.) being identified with an optical code. In another example, the virtual user interface 114 may include medical charts or other medical data of the patient 106. In some configurations, the image data set 116 or captured radiological data of a person may be displayed by the AR headset 108 using a volume of the image data set 116 to display radiologically captured anatomy (e.g., bones 106b, tissue, vessels, fluids, etc.) of the patient 106 from the image data set. This image data set 116 may contain axial slices, coronal slices, sagittal slices, or oblique slices of the image data set 116. Slices or image projections may be two-dimensional (2D) slices, three-dimensional (3D) slices, and/or four dimensional (4D) slices (3D images with a time sequence of images) that have a depth as well as a height and width (e.g., one or more layers of voxels). A user 104 may control the virtual user interface 114 using: hand gestures, voice commands, eye movements, remote controls (e.g., a finger clicker), a 3D mouse, a VR wand, finger sensors, haptic technology, or other control methods.

In one example configuration, multiple users each wearing an AR headset 108 may be simultaneously present to view the patient 106 augmented with an image data set 116 for the patient 106. For example, there may be multiple AR headsets 108 that are used during medical procedures. One AR headset 108 may be used by a first medical professional to adjust and manipulate the radiological images being displayed to both AR headsets and the second head set may be used by a second medical professional to assist in performing the medical procedure on the patient. Additionally, one medical professional may be able to turn on or off the radiological image at the request of the other medical professional.

Figure 2:
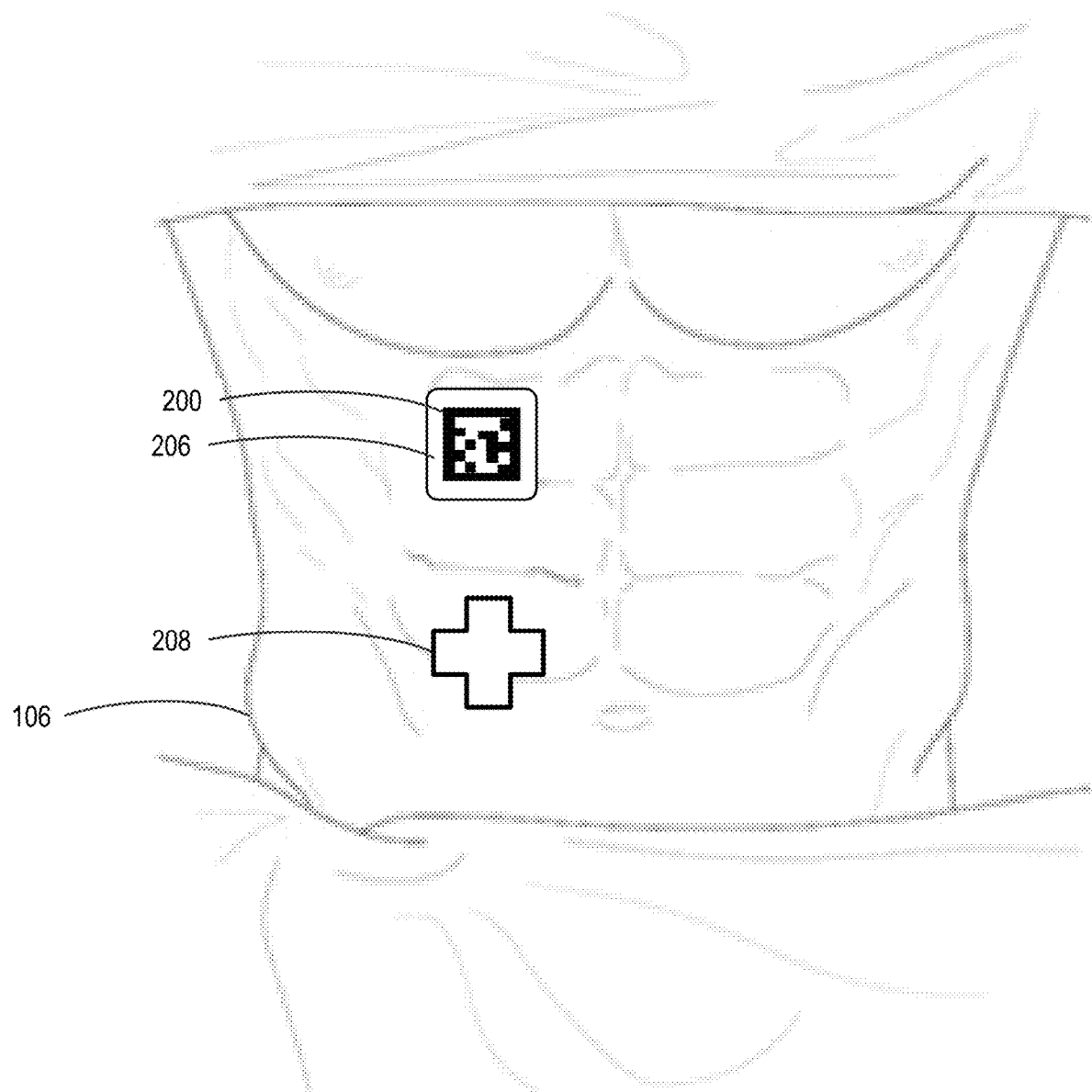
FIG. 2 illustrates an example of an image visible marker or image visible marker with an optical code that is affixed to a body of a patient.

FIG. 2 illustrates an image visible marker 206 with an optical code 200 formed into the radiopaque material (e.g., metal or other radiopaque material) of the image visible marker, and the image visible marker can be affixed to the patient 106. An image visible marker 208 that is blank or does not include an optical code or other symbols is also illustrated. With reference to both FIG. 1 and FIG. 2, the optical code formed with the image visible marker may be perceptible to a sensor (e.g., an optical sensor, camera, or IR sensor) built into the AR headset 108. In some embodiments, the optical code 200 may be an AprilTag, a linear barcode, a matrix two-dimensional (2D) barcode, a Quick Response (QR) code, or some combination thereof. An AprilTag is type of two-dimensional bar code which may be a visual fiducial system which is useful for augmented reality and camera calibration. The AprilTags may be used to compute the 3D position, orientation, and identity of the optical codes relative to a camera, sensors, or AR headset. In addition, the optical code formed into the image visible marker or radiopaque marker may be in a shape, such as a cross, L shape, an image, characters, an alpha numeric value, an icon, or any shape that can be formed into the image visible marker or any shape the image visible marker may be formed into that can be recognized by the AR headset. Similarly, an image visible marker without an optical code (e.g., a blank image visible marker) may be formed into any shape, such as: a cross, L shape, characters, an alpha numeric value, an icon, or any shape that can be cast, printed or otherwise manufactured and may still be recognized by the AR headset.

The optical code 200 may be formed into or combined with an image visible marker 206 that is perceptible to a non-optical imaging modality. Examples of a non-optical imaging modality may include, but are not limited to, an MRI modality, a Computerized Tomography (CT) scan modality, an X-ray modality, a Positron Emission Tomography (PET) modality, an ultrasound modality, a fluorescence modality, an Infrared Thermography (IRT) modality, 3D Mammography, or a Single-Photon Emission Computed Tomography (SPECT) scan modality. In another example, the non-optical images or image data sets may be an image or image data set which includes a combination of two or more forms of non-optical imaging modality as listed above (e.g., two or more images combined together, combined segments of two or more non-optical images, a CT image fused with an MRI image, etc.).

Forming the image visible marker 206 from a material that is perceptible to a non-optical imaging modality may enable the image visible marker 206 or image visible marker with the optical code formed into the image visible marker 206 to appear in an X-ray generated image that is captured using an X-ray imaging modality. For example, the optical code may also be visible in the X-ray generated image. Examples of image visible marker 206 material may include, but is not limited to: metal, radiopaque liquid, radiopaque plastic, metal impregnated rubber, metal strips, paramagnetic material, and metallic ink. If an optical code is used, the optical code may be formed directly into or onto an image visible marker so the image visible marker and optical code are joined together and can be obtained (e.g., be visible) using an X-ray generated image and a sensor of the AR headset (e.g., a visible light camera or an IR camera). For example, the optical code may be engraved into, milled into or built onto a radiopaque material to make an optical code visible on an image visible marker in an X-ray imaging modality. Further, the metal may be built up to provide a visible optical code or troughs may be formed in the metal to make an optical code visible in the metal (e.g., titanium).

In yet another alternative, the image visible marker 206 may be embedded within the optical code 200 itself, such as where the image visible marker 206 is embedded within an ink with which at least some portion the optical code 200 is printed and the ink includes a material that is perceptible to the non-optical imaging modality, such as ink particles or additive printing manufacturing materials that are radiopaque and are not transparent to X-rays. In these embodiments, the optical code 200 itself may serve both as an optical code and as the image visible marker. Additionally, the image visible marker 206 may be arranged by affixing or printing (at least temporarily) the optical code 200 with radiopaque ink particles directly on the skin 106a of the patient 106.

Once the image visible marker 206 or image visible marker with the optical code 200 is affixed to the patient 106, the X-ray imaging modality (to which the image visible markers 206 and optical code 200 are perceptible) may be employed to capture an X-ray generated image of the patient 106 and of the image visible markers 206 or image visible markers with the image visible optical code 202. As a result, the image visible marker 206 or the image visible marker with image visible optical code 202 will appear in the X-ray generated image of the patient 106, and the position of the image visible markers 206 or the image visible markers with the image visible optical codes 202 will appear in the X-ray generated image in a fixed position relative to the positions of the internal anatomy of the patient 106.

Then a user 104 (such as a medical professional) may employ the AR headset 108 to determine a location of the image visible marker or image visible marker with the optical code 200 on the body of a person or patient. Next, the AR headset 108 may automatically retrieve the image data set of the patient 106 based on the image visible marker or image visible marker with the optical code.

The X-ray generated image(s) and the image data set may then be aligned using data fitting. More details on data fitting will be given in the discussion of FIG. 3. The X-ray generated image(s) and the image data set may be aligned using anatomical structures found in both images (e.g., bones). In one example, the image visible marker 206 or image visible marker with the image visible optical code 202 in the X-ray generated image may be copied to the image data set or both the X-ray generated image and the image data set may be fused together and so both images will have the image visible marker due to the fusing of the images. In the optional case where an image visible optical code 202 is being used, the image visible code 202 may be copied into the image data set along with the image visible marker.

Accordingly, both the location of image visible marker or the image visible marker with the optical code can be detected by the AR headset 108 and the position of the image visible marker(s) 206 or the image visible marker with the optical code are known in the 3D space 102 (see FIG. 1). After detecting the location of the image visible marker(s) or the image visible marker with the optical code in the 3D space 102, the AR headset 108 may then align the position of the internal anatomy of the patient 106 in the 3D space 102 by aligning the image visible marker(s) 206 in the 3D space 102 (as detected by the AR headset) with the position of the image visible marker(s) 206 or the image visible marker with the image visible optical code 202 in the image data set. This alignment may then enable the AR headset 108 to display, in real-time, the internal anatomy of the patient 106 from the image data set projected onto actual views of the patient 106.

In a further example, multiple image visible markers 206 or the image visible markers with optical codes 200 may be simultaneously affixed to the patient 106 in order to further ensure accurate alignment of image data set for the patient 106 with actual views of the patient 106 in the 3D space 102. Further, since the image visible markers 206 or the image visible marker with optical codes 200 are affixed to an outside layer of the patient 106, the markers 206 may not all be in one plane, but instead may conform to any curvatures of the outside layer of the patient 106.

Figure 3:
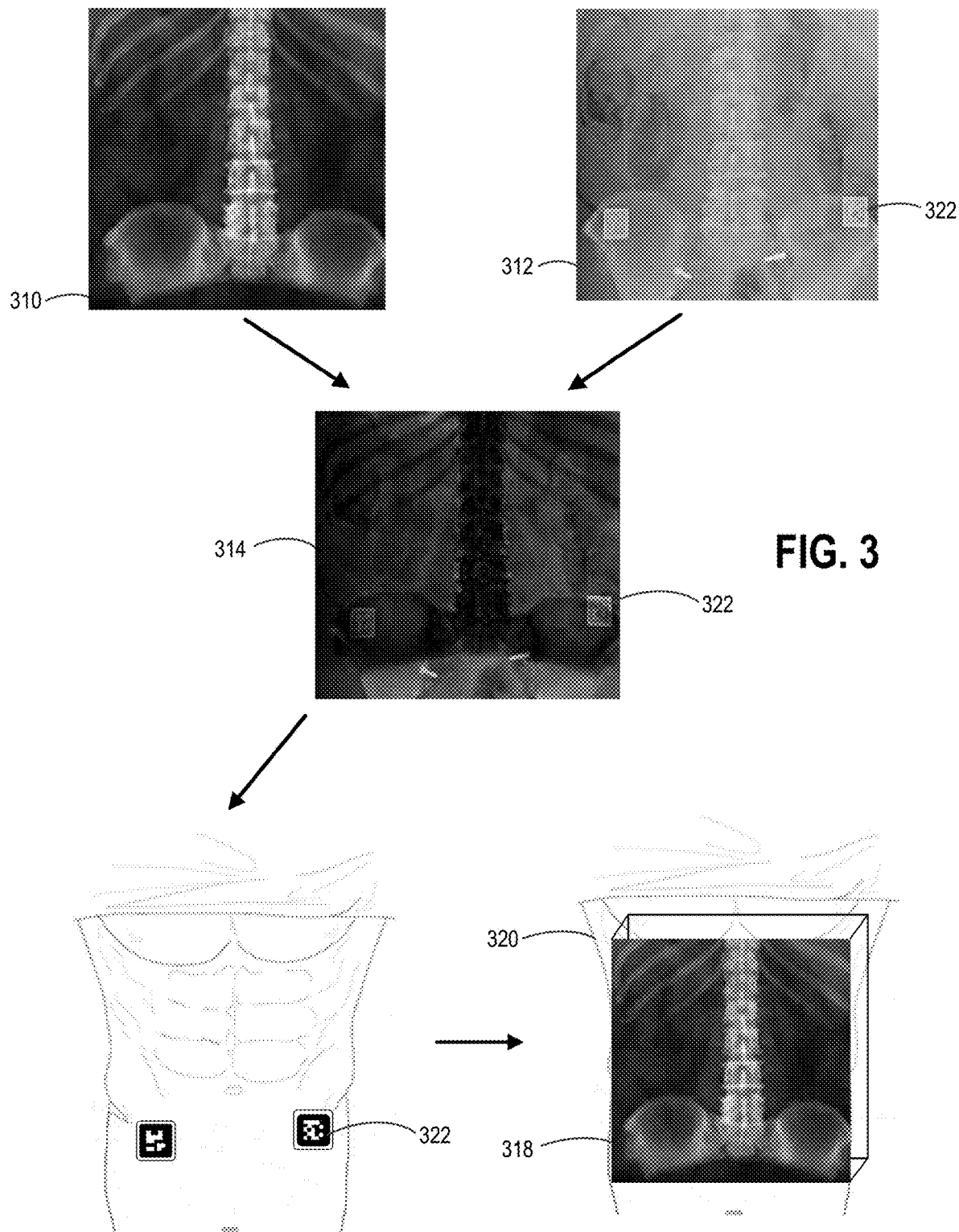
FIG. 3 illustrates an example of an X-ray generated image that is aligned with an image data set using data fitting, and then the image data set is aligned with the body of the patient using an image visible marker or image visible marker with an optical code.

FIG. 3 illustrates a more detailed schematic diagram of a method for aligning an image data set 310 with a body of a patient 320. An image data set 310 containing a representation of an anatomical structure of a patient may be obtained and may not include an image visible marker that could be used for alignment purposes. This image data set 310 may be a 3D image data set and may represent a volume defined by those obtaining the image data set 310. The image data set 310 may be a CT (computed tomography) image, MRI (magnetic resonance imaging), a 3D X-ray image, a Positron Emission Tomography (PET) image, a fluorescence modality, an Infrared Thermography (IRT) modality, 3D Mammography, or a Single-Photon Emission Computed Tomography (SPECT) scan modality, nuclear image or an ultrasound image. In one example, the image data set may be a CT scan that is captured as: a maximum intensity projection (MIP) image, an average intensity image, or a minimum intensity image.

A two-dimensional (2D) X-ray generated image 312 of at least a portion of the anatomical structure of the patient in the image data set 310 may also be obtained during a medical procedure or prior to a medical procedure. The image data set 310 may be aligned to the X-ray generated image 314 by using data fitting to align an anatomical structure shared between the image data set 310 and the X-ray generated image 310. In one configuration, a MW version of a CT scan may be aligned with the X-ray generated image. In particular, using a MIP version of a CT scan may provide similar pixel and/or voxel intensities in both the image data set 310 and the X-ray generated image(s) 312 and may improve the alignment process.

Anatomical structures which may be used for aligning the image data set 310 and the X-ray generated image 312 may include, but are not limited to: bones (e.g., the spine, vertebrae, the iliac crest, ribs, pelvis, or other bones), cartilage, skin or organs identifiable in the X-ray generated image 310. These anatomical structures may have a machine detectable structure in the X-ray generated image 310 which can be aligned with the same machine detectable anatomical structure in the image data set 312. Alternatively, a user or medical professional may mark the anatomical structures to be aligned in the image data set 312 or the X-ray generated image. The data fitting may at least one data fitting process, such as using: the difference, the square of the difference, best fit, a least squares best fit, a least squares best fit using the squares of the differences, curve fitting, regression analysis or another known data fitting algorithm that enables alignment of the shared anatomical structure in the image data set 312 with the X-ray generated image 310 or vice versa. In one configuration, at least two X-ray generated images may be obtained to enable alignment in a depth direction using one or more radiopaque markers and optionally their optical codes.

As discussed before, an optical code can be formed into the metal of the radiopaque marker. The patterns for the optical code in the metal of a radiopaque marker may be formed using troughs in the metal or the shapes for the optical code may be raised metal. In either case, the differing thicknesses or 3D protrusions for the optical code can be seen or detected in the X-ray generated image and can be detected in visual images or IR images obtained by the AR headset. In an alternative configuration, the radiopaque marker may be made of metal with an optical code in the metal but also have a printed optical code (e.g., 2D on paper or plastic) affixed over the metal. The radiopaque marker may also have varying shapes for identification purposes (e.g., square, triangle, circle, rectangle, etc.). The optical code formed into the radiopaque marker may be: a linear bar code, a matrix two-dimensional (2D) bar code, a quick response (QR) code, or an AprilCode. Further, the optical code formed into the image visible marker or radiopaque marker may be in a shape, such as a cross, L shape, an image, characters, an alpha numeric value, an icon, or any shape that can be formed into the image visible marker or any shape the image visible marker may be formed into that can be recognized by the AR headset. It is useful for the optical code to be detectable in the visual domain or IR domain to enable detection by the sensors of the AR headset, while also being detectable in the non-visible imaging modality (e.g., x-ray) that may be used for alignment during the medical procedure. Forming the optical code into the image visible marker or radiopaque marker or from the radiopaque materials means that the optical code is coincident in space with the image visible marker.

A location of an image visible marker or the image visible marker with an optional optical code can be defined in the image data set 310 after alignment with the X-ray generated image 312. For example, the image visible marker or the image visible marker with an optical code 322 in the X-ray generated image 312 may be copied to the image data set 310 after the image data set 312 and the X-ray generated image 312 have been aligned. Alternatively, the image data set 312 and the X-ray generated image 312 may be fused and this means the image visible marker or the image visible marker with an optical code can be in the fused image.

The image data set 314 and/or X-ray generated image 312 may then be aligned with a body of the patient 320, based in part on the image visible marker or an image visible marker with an optical code 322 defined in the image data set 314 as referenced to the image visible marker or image visible marker with an optical code 322 visible on the patient through the AR headset.

A point location for the image visible marker or the image visible marker with an optical code on the body of the patient in the 3D coordinate system may be identified by computing a ray from an X-ray source through the center of the radiopaque, image visible marker in each of at least two X-ray generated images 310. The image visible marker is then determined to be at an intersection of at least two computed rays. Further, a location for an image visible marker on the body of the patient can be identified by computing a ray from an X-ray source through a center of the radiopaque marker in the X-ray generated image and determining that the radiopaque marker lies at an intersection of the ray and the visible skin.

Another method for determining a location of the image visible marker or image visible marker with an optical code may use a single X-ray where multiple points on a single radiopaque marker are identified, then the field of view (FOV), focal length or focal point of the x-ray may be known. These points on the radiopaque marker and x-ray attributes can be used to compute a PMP (perspective multi point) computation and determined the location of the image visible marker or image visible marker with an optical code.

The aligned image data set may then be displayed as an overlay 318 to the body of the patient 320 as viewable through a lens (e.g., a waveguide lenses) of the AR headset. In one configuration, as discussed, the X-ray generated image 310 and the image data set 312 may be fused and the X-ray generated image 312 and image data set 312 may be displayed using the AR headset and an image visible marker or the image visible marker with an optical code 322 to form a single graphical view as an overlay to the body of the patient viewable through a lens of the AR headset.

The present technology enables an image data set to be aligned with a body of a person, even if the image data set was captured without an image visible marker or image visible marker with an optical code for aligning the image data set with the body of the person. In one example, the medical professionals can obtain a CT scan previously captured without any image visible markers or image visible markers with corresponding optical codes. The image visible markers or image visible markers with optical codes can be added onto the patient prior to a medical procedure. The image visible codes or image visible markers with optical codes can then be identified and registered by the AR headset.

Because the patient was scanned without image visible markers or image visible markers with optical codes, then in the operating room, the medical professionals can take one or more 2D X-ray projections of the patient in the operating room. The radiopaque shapes (e.g., squares) or the image visible markers with optical codes formed in them can be placed on the patient in the operating room and can be captured in the 2D X-ray projection. For example, the metal shapes may be titanium squares that are visible in the X-ray generated image. In the case where optical codes are formed in the radiopaque shapes, the X-ray projection can capture the radiopaque shapes along with the optical code patterns engraved into or formed onto the metal shapes. Aligning and/or merging the X-ray generated image 312 with the CT image scan 310 enables the computation of 3D coordinates defining where the image visible codes 322 are in the CT image space using the X-ray generated image. The shared anatomical structure (e.g., the patient's spine, iliac crest, sternum, etc.) in the X-ray generated image and the image data set enables the alignment of these two images.

In a more detailed alignment example, a CT scan may capture internal anatomical structures such as a patient's: spine, iliac crest or sacrum. The CT scan can then be rendered as a MIP (maximum intensity projection) image. This makes the MIP resemble an X-ray generated image in intensity and bones may be better identified for the alignment processing using MIP. The image visible markers or image visible markers with optical codes can be placed on the patient in the operating room and an X-ray generated image may be captured while the patient is in the operating room. In the example case of vertebral bones, the vertebral bones and the radiopaque codes are both visible in the X-ray generated image. The goal is to align the CT scan (e.g., hologram) to the real patient visible through the AR headset even though there are no image visible markers in an earlier CT scan of the patient.

Bone or similar elements in the CT scan that are readily identifiable in the X-ray generated image can enable the CT scan and the X-ray generated image to be mapped together using the common anatomical structures. The image visible markers or image visible markers with optical codes that are visible in the X-ray generated image can be transferred to the image data set to perform the alignment of the image data set with the patient. The image visible marker may be blank titanium tags or titanium tags that have an optical code that is visible with the human eye and AR headset (engraved or just printed). The blank titanium tags or titanium tags that have an optical code may be visible in the X-ray generated image (engraved or built up metal patterns). This allows the technology to learn (e.g., copy) where image visible markers or image visible markers with optical codes need to be on the original CT scan (e.g., a CT scan's 3D coordinate system or frame of reference) indirectly.

Referring again to FIG. 3, the X-ray generated image 312 cannot be rotated in three dimensions or viewed from different virtual camera perspectives. On the other hand, a CT scan 310 is a 3D image data set that a user can rotate and view from different rendered perspectives in the AR headset or on a 2D screen. The merger of the X-ray generated image 312 and CT scan 310 is illustrated as a combined image 314 where the bright areas in the image are the difference between the corresponding images at each location and shows the "square of the difference" between the images. More specifically, the combined images show that most of the spine is canceled out and is dark because the spine is in both images and aligns. This alignment occurs as a "best fit" alignment using the AR headset during the medical procedure. The alignment process aligns the bones or anatomical structure such as the spine, iliac crest, spinal discs, spinal cord, organs and/or other structures. For instance, the spines can line up and/or the iliac crests may partially line up. The alignment process can execute and move (e.g., translate or rotate) the two or more images (CT scan and X-ray generated images) with respect to each other until the images align as closely as possible. When the shared anatomical structures are highly aligned between the CT scan and X-ray generated images, then the alignment process determines that the CT scan is at the same position the X-ray generated image was taken, the same angle as the X-ray generated image was taken, the same magnification the X-ray generated image was taken, etc. The system may use an orthographic projection or a perspective projection (e.g., anatomy that closer is bigger and anatomy that is farther away is smaller) of the CT scan for this alignment process.

Capturing a radiopaque, image visible marker or image visible marker with optical codes in the X-ray generated image may link the image visible markers or image visible markers with optical codes to a patient's internal anatomy (e.g., the lumbar spine, pelvis, ribs, etc.). The fusing of the two images using the bony anatomical structures is a co-registration linking factor. Thus, the image visible markers or image visible markers with optical codes are tied to anatomical structures of the patient (e.g., bone) and the alignment is further tied to anatomical structure visible in both the X-ray generated image and image data set.

Figure 4A:
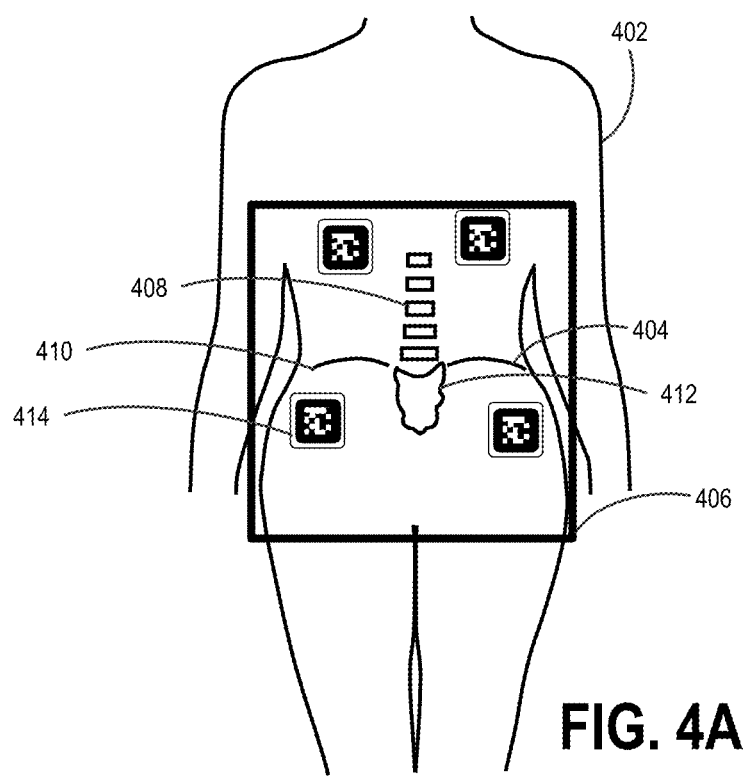
FIG. 4A illustrates an example of a view of a body of a person with bones and radiopaque markers with optical codes.

FIG. 4A illustrates an example of a person's body 402, the person's iliac crest 404, and an illustrated spine 408. The alignment process can determine where the X-ray generated image matches on the body of the person. The image visible markers or the image visible markers with optical codes 420 may be in the X-ray generated image at a defined location and the center of the optical code can be found using the intersection of the diagonals or centroid of the optical codes. An image data set 406 aligned with the X-ray generated image using the bones (e.g., spine 408, iliac crest 410 or sacrum 412) can then be aligned with the person's body 402 using the image visible markers or image visible markers with optical codes 414 in a fused image (of the X-ray and image data set) or the image visible markers copied into the image data set 406.

Figure 4B:
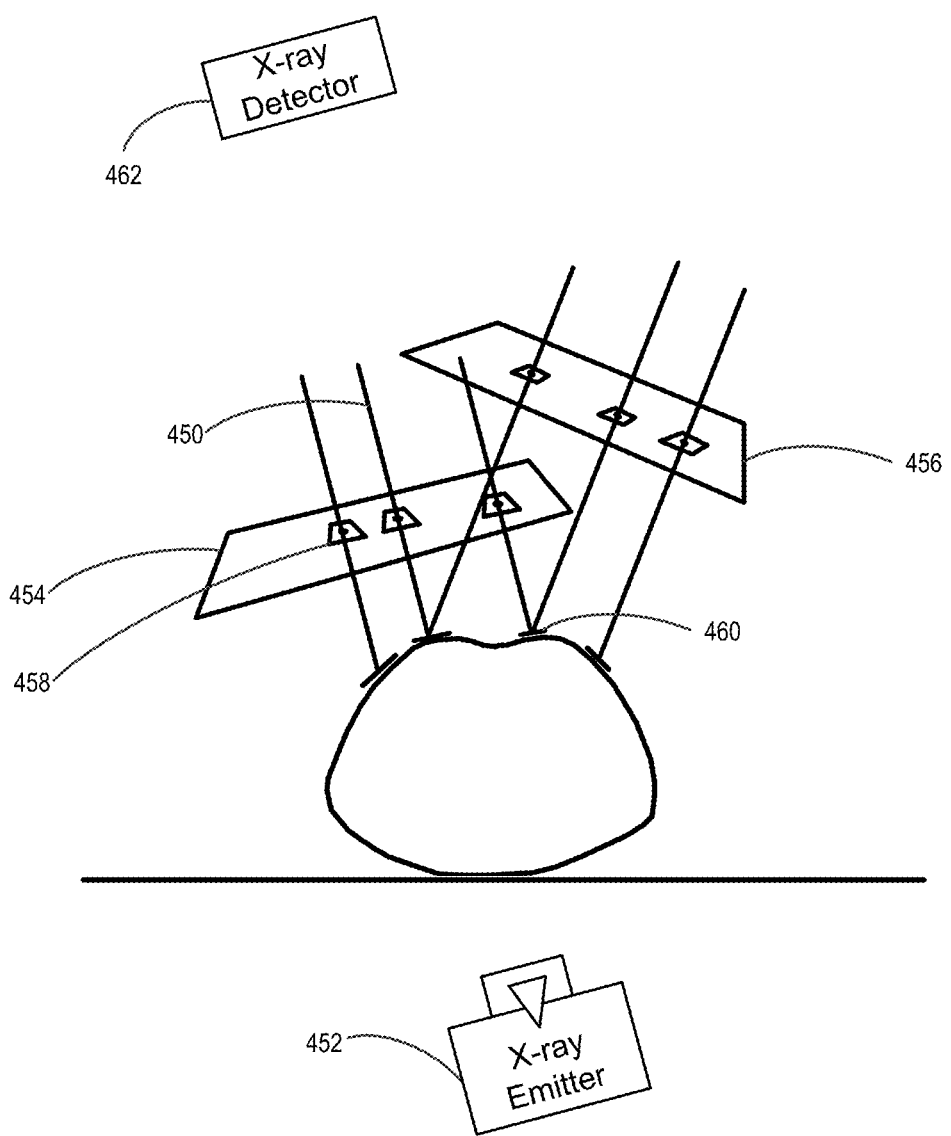
FIG. 4B illustrates an example of a view of the body of the person as in FIG. 4A with mapping rays from the X-ray source(s) to the skin of the body in order to locate a position of the image visible markers or image visible markers with optical codes on the skin.

FIG. 4B illustrates that the locations of image visible markers or image visible markers with optical codes can be determined on the patient using rays 450 (e.g., a mapping ray) defined from the known location of the X-ray source 452 to the X-ray detector 462. The rays 450 can pass through the center of the image visible marker 458 or image visible marker with optical code to the patient and through the body if desired (not shown). When the mathematical construct of the ray is created, it is known that the image visible marker is on the ray or line but the system does not know exactly where on the ray the image visible marker or image visible marker with optical code 458 may be with respect to the body. However, the location where the ray intersects the skin may be known, if the image visible markers or image visible markers with optical codes are put on the skin.

In the case where the image visible marker or image visible marker with an optical code is not on the skin, one or more additional 2D X-ray generated images may be captured from at least two viewpoints. For example, a first X-ray generated image 454 may be from a first view and the second X-ray generated image 456 may be 45 degrees from the first view, etc. As discussed, the source location for the X-rays is used to find the location of the titanium image visible markers or image visible markers with optical codes.

The X-ray generated image can be a projection of the person's body from the X-ray source. The rays or projections from at least a second angle enable a location of the image visible marker or image visible marker with an optical code 460 to be determined without assuming the code is on the skin. After the two or more X-ray generated images from separate viewpoints have been obtained, then the location of the image visible markers or image visible markers with corresponding optical codes can be found using triangulation. In one example, the image visible marker may be placed on internal anatomical structures (bones, organs) and may not be on the skin.

Once the locations of the image visible markers are identified in 3D coordinates (e.g., x, y and z Cartesian coordinates) using the two X-ray generated images then the system can identify where each image visible marker is to be located in the image data set to enable alignment of the image data set with the body of the person. To reiterate, the rays can either intersect with the skin to identify the location of the image visible markers or image visible markers with optical codes, or the rays representing one or more additional X-ray projections can be triangulated and define where the image visible markers are in the 3D coordinate space viewed by the AR headset.

In practice, the CT scan for a patient may have been previously captured without image visible markers or image visible markers with optical codes. Instead of spending the time to have the CT scan re-captured with image visible markers or image visible markers with optical codes prior to surgery, the patient can arrive at a surgical facility and have two X-ray captures. Then alignment of the image data set with the body of the person can take place followed by a medical procedure. The use of two dimensional X-ray exposures in this technology is valuable because X-rays imaging devices (e.g., X-ray C-arms, etc.) are: less expensive than CT or MRI scans, widely used, more convenient and more available than other image modalities (such as a CT scan or MRI).

When obtaining the additional X-ray generated images, a C-arm can be used to rotate around the person's body to get the extra X-ray generated images. In one case, the additional X-ray generated images may be generated using angles that are different than the original X-ray. When the 2D X-ray generated image and the 3D image data set are aligned using data fitting, then the two images are aligned in the X and Y coordinates and the images can be rotated (along the spine or other marker) so the CT scan further matches with the 2D X-ray generated image. This process can reconstruct the CT scan from any view or projection and then align the CT scan with the 2D X-ray generated image.

Figure 5:
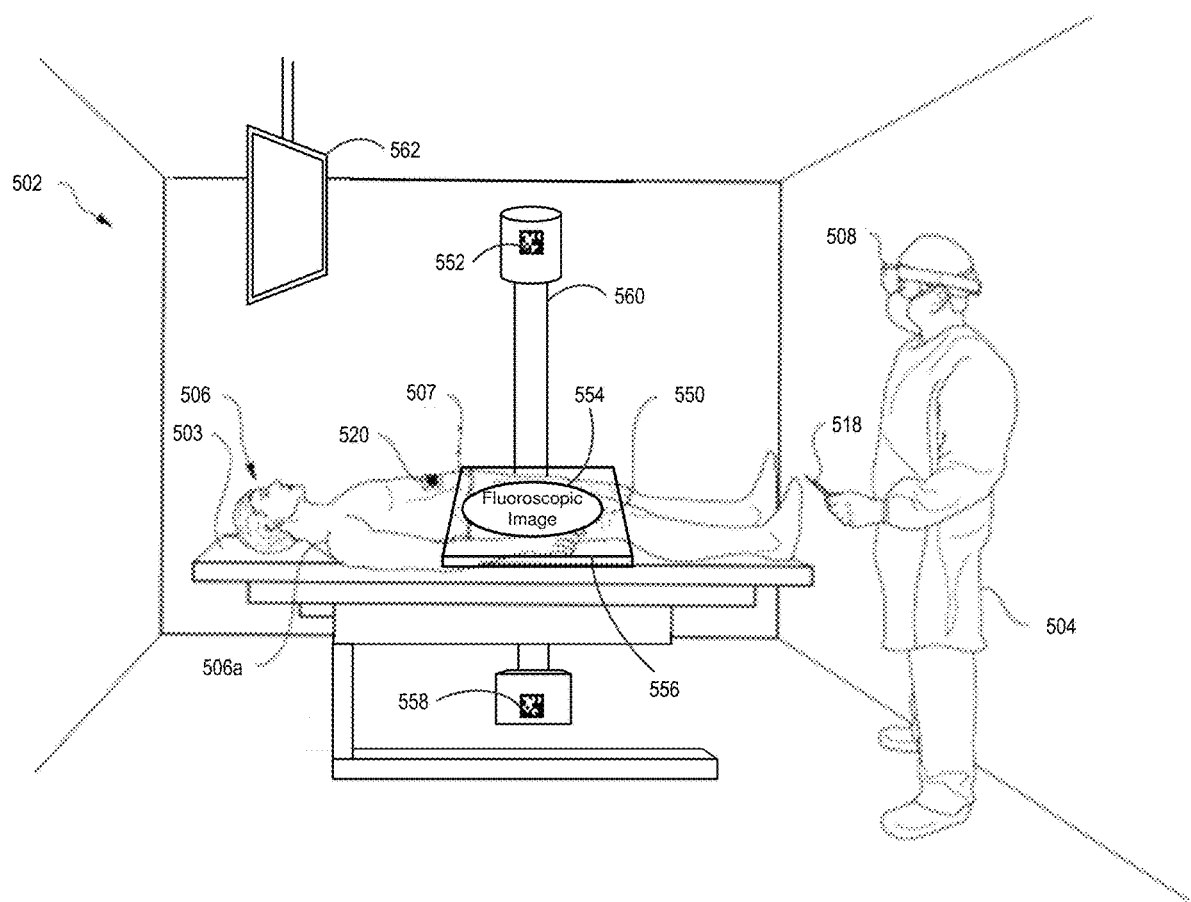
FIG. 5 illustrates an example of using an augmented reality (AR) display to enable viewing of an x-ray generated image and an image projection from an image data set with respect to a body of a person using image visible markers or image visible markers with optical codes.

FIG. 5 illustrates a technology 502 for using an augmented reality (AR) system to display an X-ray generated image 554 and/or an image projection 556 from an image data set, as aligned with respect to a body 506a of a person 506. A fluoroscopic device 560 may send a beam of X-rays (e.g., continuous X-rays or a single exposure) through the patient to obtain one or more X-ray generated images or live video of the fluoroscopic imaging of the patient viewable by the medical professional. The fluoroscopic device 560 may also be mobile with respect to the body of the person.

An image projection 556 may contain or represent at least one anatomical structure in the body of the patient. The image data set may also be a CT scan captured as: a maximum intensity projection (MIP) image, an average intensity image, or a minimum intensity image.

The X-ray generated image 554 may contain at least a portion of the anatomical structure in the image data set. The anatomical structure shared between the image data set and the X-ray generated image 554 may be: bones, cartilage, skin, or organs visible in the X-ray generated image and the image data set. The X-ray generated image 554 may also contain an image visible marker or image visible marker with an image visible optical code that is generated from an optical code made of metal or radiopaque material or an optical code formed into metal or radiopaque material. In one configuration, two or more X-ray generated images may be used to enable alignment of the image data set with the body of the person using the X-ray generated images and the image visible marker or image visible marker with the optical code.

The image data set may be aligned to the X-ray generated image 564 by using data fitting to align the anatomical structure (e.g., bones) that is shared in the image data set (e.g., the image projection 556) and the X-ray generated image 554. The data fitting may be performed using: the difference of the image, the square of the differences, best fit, a least squares best fit, a least squares best fit using the squares of the differences, curve fitting, regression analysis or another known data fitting technique.

Once the image projection 556 from the image data set and the X-ray generated image 554 are aligned, a location of the image visible marker or image visible marker with an optical code can be defined in the image projection 556 from the image data set based on the alignment with the X-ray generated image 554. As discussed earlier, the image visible marker or image visible marker with an optical code may be combined together in a titanium marker with an optical code formed in the image visible marker. In one configuration, the system may copy the image visible marker or image visible marker with an optical code from the X-ray generated image to the image data set. Alternatively, both the image data set and X-ray generated image may be fused into a single image.

The image projection 556 from the image data set may then be aligned with a body of the patient, using an image visible marker or an image visible marker with an optical code viewable on the patient anatomy and the image visible marker defined in the image projection 556 from the image data set (or fused image).

An orientation and position of an X-ray imaging C-arm can be determined using a plurality of optical codes 552, 558 on the X-ray imaging C-arm. Thus, the orientation and position of the X-ray generated image 554 captured by the X-ray imaging C-arm are also known. An orientation of the C-arm in a 3D coordinate space with respect to the AR headset or patient for which an X-ray generated image 554 is captured may be determined. A slice, slab or 3D volumetric projection of the image projection 556 from the image data set may also be constructed in a plane that aligns with the orientation and position of a plane of the X-ray generated image 554 in the 3D coordinate space at a defined thickness, which is viewable through the AR headset. The image projection (e.g., slice) and/or X-ray generated image may be displayed to form a graphical view as an overlay to the patient anatomy using the AR headset. Alternatively, the image projection may be displayed on a video monitor 562.

An alternative method for detecting the position of the mobile fluoroscopic device (e.g., C-arm) is to detect the shape of the mobile fluoroscopic device or C-arm using sensors in the AR headset. These sensors on the AR headset may visible light cameras, IR sensors, LIDAR or any sensor that can be used with software to detect the shape, position and orientation of the C-arm in the 3D coordinate system viewed by the AR headset. Such auto-detection of a C-arm by shape can avoid or help reduce the use of optical codes on the C-arm.

In a more specific example, the X-ray generated image 554 and image projection 556 may have a position and/or orientation defined by a fluoroscopic device 560 and/or an image visible marker. A camera or sensor (e.g., a visible light sensor or IR sensor) linked to the AR system or AR headset 508 may capture visual image data of a portion of a body of a person on an operating table 503 and a fluoroscopic device 560 which is mobile with respect to the body of the person. One or more optical codes on the body of the person 506a and one or more optical codes on the fluoroscopic device 552, 558, can be identified and scanned in from the image data using optical code recognition and scanning techniques or other optical code recognition techniques.

An image projection 556 may be selected to display a portion of an image data set associated with (e.g., parallel to, oblique to, or another fixed orientation) an X-ray generated image 554 that is being captured. The image projection 556 may also display specific anatomy structures for the body of the person, such as veins, nerves or bones. The X-ray generated image 554 may be a single layer projection (e.g., a two-dimensional (2D) projection). Alignment, positioning and orientation may be performed using: image visible markers or image visible markers with optical codes 520 on the body of the person, representations of image visible markers copied into the image projection as described earlier, image visible markers or image visible markers with optical codes captured in the X-ray generated image 554, and optical codes 552, 558 on the fluoroscopic device (e.g., a C-arm device, a catheterization lab, an angiographic lab, or a fluoroscopic device with a movable emitter and detector).

The image projection 556 is projected from the image data set to define a single plane view or a "slab" that is a multi-planar reconstruction (MPR) of the image data set (e.g., multiple layer projection). The image projection may be of any selected thickness and may be a MW (maximum intensity projection) of tissue in the appropriate view. Image projections which do not align with the orientation of the fluoroscopic device may also be created at any position, orientation or angle, as desired.

At least one of the image visible markers or image visible markers with optical codes 520 can be on the body of the person (as described in detail previously). This allows an image data set (e.g., a captured radiology image) with the image visible marker or image visible markers with optical codes copied from the X-ray generated image to be aligned with the body of the person 606 using the image visible marker or image visible marker with the optical code on the body of the person. Portions of the body of the person may be covered with fabric 507 but the internal anatomy 550 of the body may be virtually viewed using the image data set.

Multiple useful views can be provided to a medical professional who is using a fluoroscopic device and an AR system, as described earlier. In one view, a projection from the image data set may move or be reconstructed in concert with the medical professional's changing actual view of the body through the AR system or AR headset. Yet another view may be provided in an AR system that displays a combined view or fused view of the x-ray generated image and a projection of the image data set (e.g., a 2D rectangular slice) that is parallel to the x-ray generated image as aligned with and overlaid on the patient (e.g., what the medical professional would see if the medical professional were at the same perspective as the X-ray beam itself). In this configuration, the projection may move or be reconstructed as the fluoroscopic device moves. The x-ray generated image 654 may be set to any level of transparency desired by the medical professional or user. In another configuration, the slice of the image data set that is reconstructed may be constructed in real-time or immediately after the 2D X-ray generated image is captured from the patient or body of the person.

The alignment process of the present technology can help reduce the amount of radiation and dye that is used in treating a patient. Because a high contrast resolution CT scan can be aligned to the patient, then more detailed aspects of the patient's anatomy can be viewed with less dye or radiation being used in the treatment procedure. An X-ray generated image does not allow the medical professional see the finer details of the patient's anatomy (aside from the bones) but the X-ray generated image does enable a live view that is useful for guiding radiopaque medical implement. By comparison, the image data set does enable viewing of the finer details the patient anatomy but needs to be aligned to the person.

The image data set can also be segmented so that specific portions of the anatomy and/or organs can be turned off or turned on and viewed from the image data set. For example, the X-ray generated image may not show the patient's blood vessels but a segmented image data set may show only the blood vessels that have been identified as a segment of the image data set. In another example, a user or medical professional may audibly ask the computer and AR headset to view certain anatomical structures because the image data set can be segmented by organ or anatomical type. The user can ask a software process on the AR headset to hide or view: bones, muscles, or other anatomical items in any combination or at any time.

Figure 6:
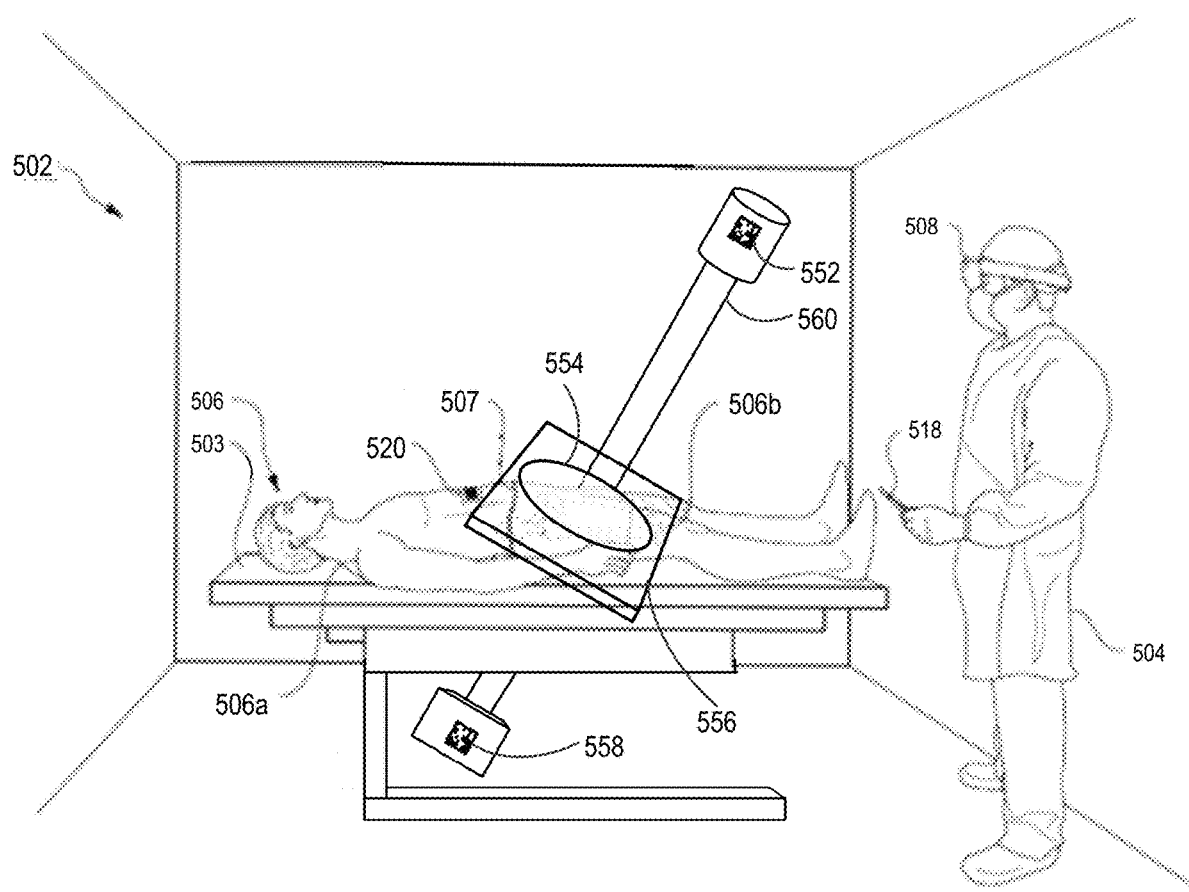
FIG. 6 illustrates an example of a fluoroscopic device which is mobile with respect to the body of the person, and the X-ray generated image and image projection may be change position and/or orientation based on the movement of the mobile fluoroscopic device.

FIG. 6 illustrates that a position of a fluoroscopic device 560 may change with respect to a body 506a of a person 506 or a patient on a table 503 to enable a medical professional 504 to obtain an X-ray generated image 554 from a different perspective. The change in the position and orientation of a fluoroscopic device with respect to the body 506a of the person 506 can be detected and quantified using one or more optical codes 552, 558 captured by a camera associated with an AR headset 508 or AR system. Due to the change in position and orientation of the fluoroscopic device 560, the position and orientation of the image projection 556 and x-ray generated image 554 may be modified. For example, the position and/or orientation of the image projection 556 from the image data set may be moved, as viewed by the AR headset, based on detected changes in position and orientation of the fluoroscopic device 560 using the one or more optical codes 552, 558 as compared to the body of a patient 506a. The image projection 556 from the image data set may be reconstructed or a new projection may be created using the modified position and orientation of the fluoroscopic device 560.

For example, the fluoroscopic device 560 may rotate 45 degrees in one axis. As a result, the image projection 556 may be recreated at that new orientation and the x-ray generated image 554 may be displayed at the rotated orientation, as viewed in the AR display, to enable the orientation of the x-ray generated image 554 and the image projection 556 to be aligned in the appropriate orientation with respect to the body 506a of the person as viewed through AR headset. The X-ray generated image 554 may have a modified orientation in 3D space with respect to the body of the person as defined by the optical codes on the body, image visible marker, and/or as defined by the modified position or orientation of the fluoroscopic device 560. Thus, position and orientation of the image projection 556 and x-ray generated image 554 can change when the position and orientation of the X-ray beam changes. Accordingly, the optical tags on the C-arm can control how the image projection or slab is reconstructed as the C-arm moves. For example, the CT scan can be reconstructed to match the X-ray generated image the C-arm is producing, and the CT and the X-ray generated imaged can be aligned and/or fused to allow the medical professional to view the fine anatomical structures (e.g., blood vessels) being targeted.

Determining the position and orientation of the fluoroscopic device 560 relative to the patient, also enables the AR system to reconstruct the image projection 556 so the image projection 556 is parallel to the x-ray generated image 554 obtained from the fluoroscopic detector (if desired). In addition, the x-ray generated image 554 can be positioned with respect to the body of the person 506a based on the position where the X-ray generated image 554 is being captured from the body using the X-ray beam. Accordingly, the X-ray generated image 554, the image projection 556, and patient's body 506a may be aligned, so that a medical professional may see the anatomical structures of the person or patient using the image projection 556 as an overlay to the person's body (e.g., over or under the X-ray generated image in the 3D coordinate system). The positioning and orientation of the image projection 556 and X-ray generated image 554 may represent an AR (augmented reality) view based on a portion of a body of a person the X-ray beam is passing through (as opposed to the point of view of the medical professional). In this case, the image projection 556 may be perpendicular to the x-ray beam.

The AR system can re-construct the 3D image data set to provide a projection from any angle that matches the position and orientation of the fluoroscopic device 554. For example, if the fluoroscopic device 560 is positioned to capture a lateral view then a lateral projection of the image data set can be provided together with the lateral X-ray generated image view. Combining and aligning of the real world view of the body of the person, image projections from the image data set, and the x-ray generated image enable a medical professional to better view and navigate the internal anatomy of the patient. The 3D (three dimensional) image data set provides better soft tissue contrast (e.g., organs and blood vessels can be seen in the internal anatomy) and a 3D reference environment that the x-ray generated image may not provide.

In one configuration, the fluoroscopic device 560 may be zoomed with respect to the body of the person 506 while capturing the x-ray generated image 554. As a result, an adjustment to the image projection 556 or image data set may be performed based on the zoom in the X-ray generated image. More specifically, once the X-ray generated image is aligned with the image projection or image data set (even if relative sizes at alignment not exactly the same), then this alignment may be used to correct for zoom issues by increasing or decreasing the size of anatomical structures in the image projection or image data set until the size of the anatomical structures matches the X-ray generated image. The anatomical structure in the images becomes a reference marker for zooming the image data set.

The use of an AR display may also provide the ability to change a view of an X-ray generated image and an image projection as aligned and displayed in an AR display in order to display the virtual patient to better match a position and orientation of the real view of a patient as directly viewed by a medical professional. Regardless of the orientation of the x-ray generated image captured by the fluoroscope device, the display of the X-ray generated image and image projection can be oriented in the AR display in a way that assists the doctor and/or matches the actual view of patient's position and/or orientation. For example, the X-ray generated image may be inverted either horizontally, vertically or oddly oriented in some other way as compared to a body of patient being actually viewed. A difficult viewing orientation may exist due to the capturing orientation of the fluoroscopic device 560. Accordingly, the image with the aligned x-ray generated image 554 and image projection 556 can be flipped or reoriented (e.g., flipped horizontally, flipped by a certain number of degrees, moved to reverse the odd orientation) for viewing by the medical professional to make a medical procedure easier to perform or match more closely with what the medical professional is seeing in an actual view. This ability to change an image orientation allows for a more intuitive interaction when performing procedures on a patient. For example, performing a medical procedure with x-ray generated image guidance can be very difficult when everything is backwards.

Figure 7:
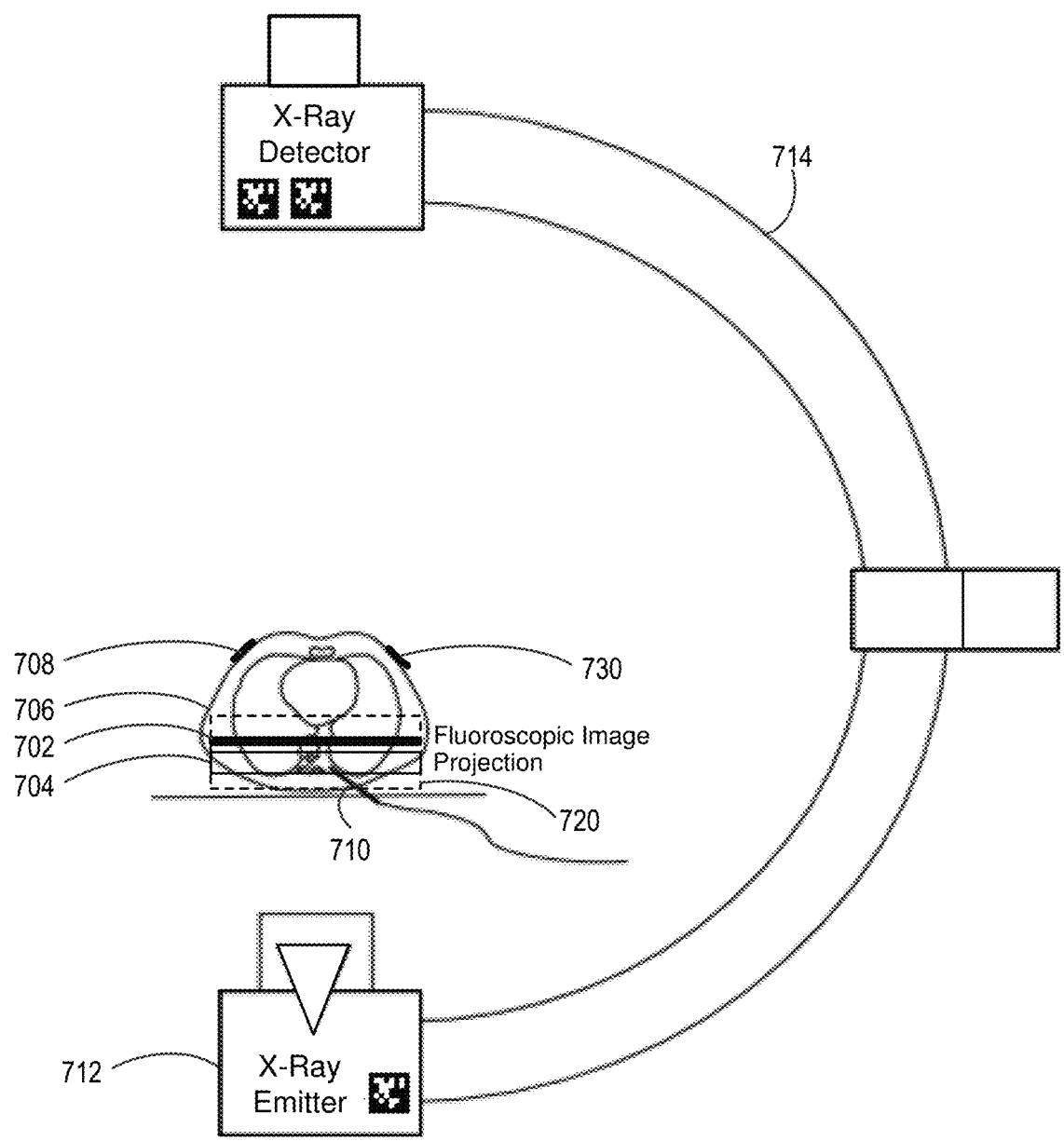
FIG. 7 illustrates a mobile fluoroscopic device generating an X-ray generated image, and an image projection is illustrated in a coronal view to enable combined viewing through an augmented reality (AR) headset or AR display.

FIG. 7 illustrates a side view of a combination of a cross-sectional view of a body of a person 706, an image projection 704 from an aligned image data set 720, an aligned x-ray generated image 702 and a fluoroscopic device 714, which may enable a medical professional to fluoroscopically guide visible items 710 within a person's body 706. A fluoroscopically visible object 710 (e.g., a needle) is able to be viewed and guided by a medical professional in the X-ray generated image 702 with respect to the image data set 720 and/or the image projection 704 aligned with the body of the person. The image projection 704 may be viewed in the AR headset or AR display as being overlaid on the X-ray generated image 702. Alternatively, the image projection 704 may appear to have the X-ray generated image 702 overlaid on top of the image projection 704 or the image projection 804 may appear to be within the aligned image data set 720. Alignment of the image data set 720 and its image projection 704 with a patient can be performed using the X-ray generated image, as described earlier.

The transparency of the x-ray generated image 702 aligned with the image data set may be modified depending on the amount of the image projection 704 or the real world body of the person 706 the medical professional desires to see.

The image projection 704 from an image data set 720 may have been captured using a Computed Tomography (CT) image or magnetic resonance image (MRI). Then the image projection 704 may be overlaid with a live X-ray generated image 702. While an X-ray generated image 702 may be a live image, the X-ray generated image does not have the 3D qualities or soft tissue contrast resolution of an MRI (magnetic resonance image) or CT (computed tomography) image. Where the X-ray generated image 702 has been aligned to a patient's body with one or more image visible markers (e.g., an AprilTag) or image visible markers with optical codes and the image projection 704 of the previously acquired 3D image data set has been aligned to an image visible marker or image visible markers with an optical code on the patient's body, then a medical professional can view the virtual end of a needle 710 as the tip moves in the body of the patient 706 using the AR headset or AR display. This combines valuable aspects of the virtual images, the X-ray generated images, and a real view of a patient. A needle, a catheter tip or similar radiopaque object can be seen under fluoroscopy but the medical professional cannot see certain soft tissue in the x-ray generated image. Thus, the combination of the real view of a patient, an image data set, an x-ray generated image, optical tags on the fluoroscopic device, image visible markers, image visible markers with optical codes, a medical implement, and optical tags on a medical implement may allow the medical professional to perform a more accurate medical procedure.

In a more specific example, the image data set may be a CT image that is initially captured without image visible codes. The CT image may provide a 3D view of the voxel slice data that has been captured in the CT scan. In addition, the CT image may be generated using as a MW rendering. A portion of the CT image may be selected that is a projection of a slab of tissue, and this provides an image that looks similar to an X-ray of a spine (i.e., bone). The projection may have a thickness of a portion of the patient's anatomy. For instance, a slab may have a certain thickness of the spine.

In the case where the CT scan has skin but includes bone such as the spine, the skin can be used to locate the position of the optical codes. Further, two or more X-ray generated images or a continuous X-ray may be used to identify optical codes at locations other than the skin by using triangulation, and then alignment can be performed without skin in the CT scan. In another configuration, one X-ray generated image may be aligned to a body of a person in an X and Y plane and then the image data set or view of the skin through the AR headset can be used to determine the location of the visible markers or optical codes in the Z direction using the skin of the patient.

If a medical professional is performing an angiogram, then the patient may be viewed with a continuous X-ray or fluoroscopy. As the medical professional rotates the beam of the C-arm during angiogram, the optical code(s) on the C-arm may allow the X-ray generated image and the MIP projection from the CT scan to have the same orientation and similar positioning.

Figure 8A:
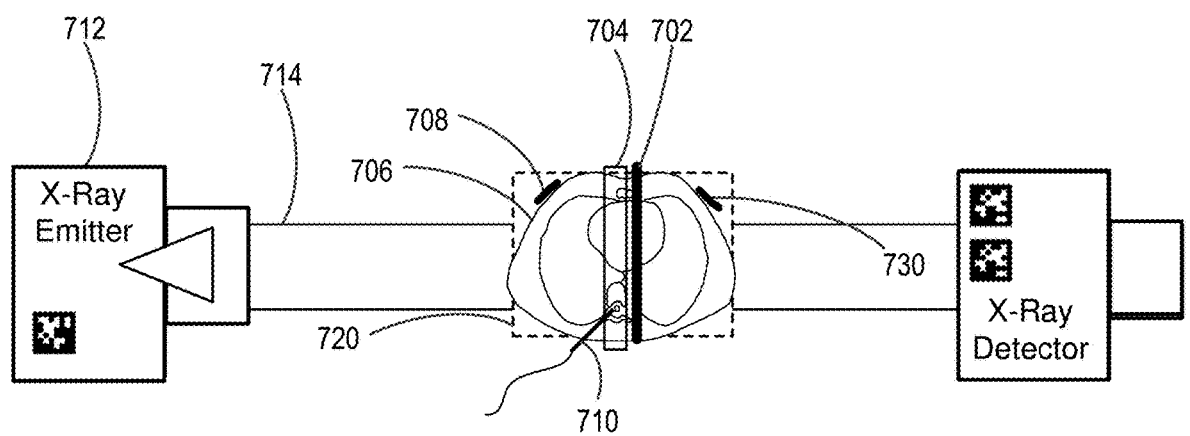
FIG. 8A illustrates a mobile fluoroscopic device generating an X-ray generated image, and an image projection is illustrated in a sagittal view to enable combined viewing through an augmented reality (AR) headset.
Figure 8B:
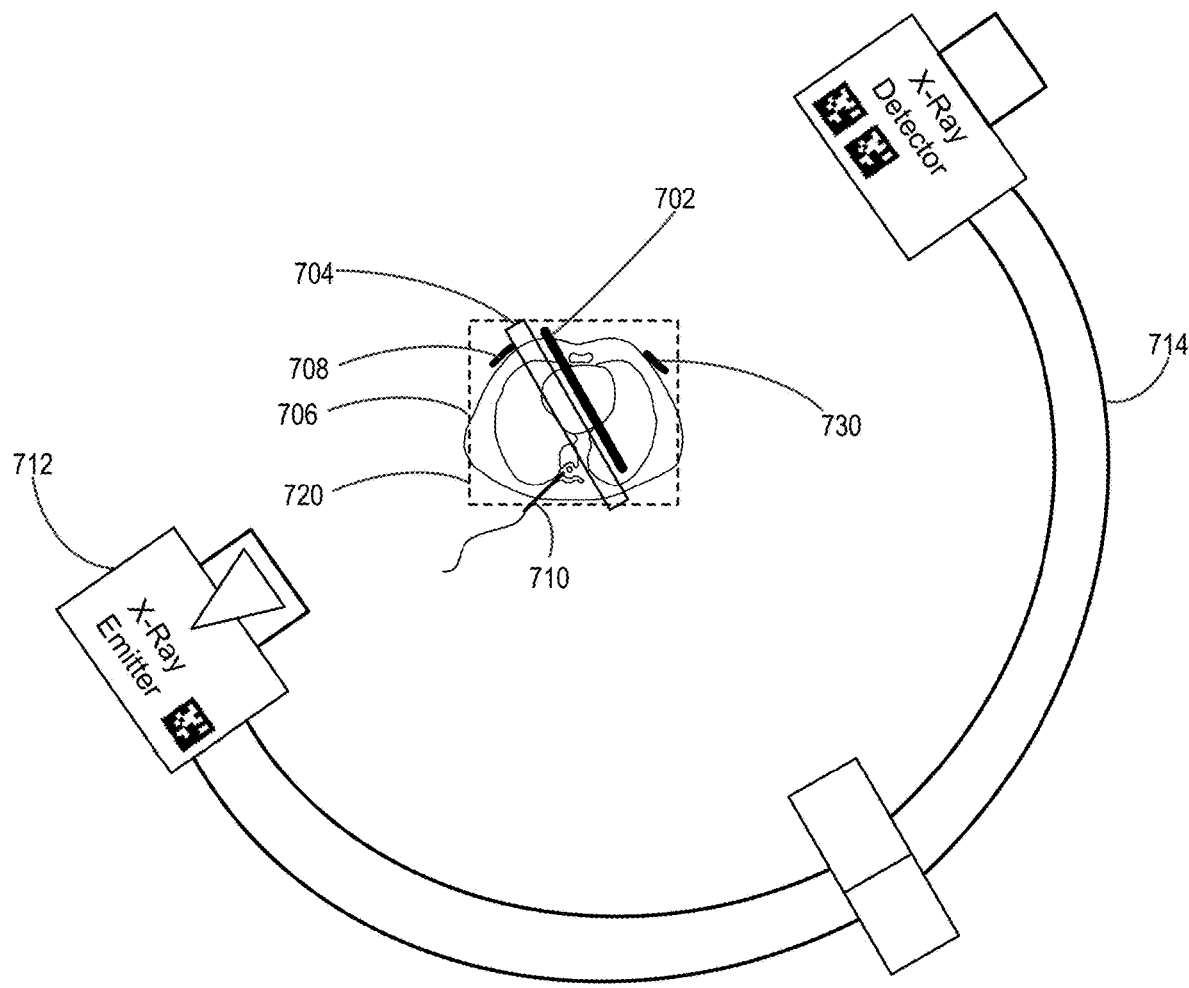
FIG. 8B illustrates a mobile fluoroscopic device generating an X-ray generated image, and an image projection is illustrated to enable combined viewing through an augmented reality (AR) headset.

FIG. 8A illustrates a projection of the CT scan 704 for a vertebral body that has been rotated 90 degrees, as compared to FIG. 7, because the C-arm has moved 90 degrees. FIG. 8B illustrates a projection of the CT scan 704 that has been moved 45 degrees as compared to FIG. 7. As described earlier, the spine or vertebrae can be used to align a CT scan 704 using the anatomical structure that is in the CT scan 704 (a bone structure) with anatomical structure in the X-ray generated image 702 (e.g., the same bone structure), and then the CT scan can be finally aligned with the patient. This registration can occur during a medical procedure and in real-time.

The projection 704 from the slab of tissue in the CT scan 720 can be mapped to the same location that the X-ray generated image 702 is capturing. The CT scan can show detailed internal tissue like blood vessels or other tissue (aorta, vessels). As a result, the medical professional can find this tissue or blood vessels on the CT scan before the medical procedure starts or during the medical procedure. Because the fluoroscope device captures a single plane that is projected through the patient and the 2D X-ray generated image is very limited in contrast and does not show soft tissue well, the use of an image projection 702 of the CT scan 720 aligned with the X-ray generated image 702 provides increased accuracy during a medical procedure. When the CT scan 720 is joined to the correct location as defined by the 2D X-ray generated image then the medical professional can get a 3D view of any anatomy that is visible in the CT scan (e.g., bones, blood vessels, organs, nerve tissue, etc.)

In some medical procedures, a medical professional may use injections of dye to help find locations in blood vessels. However, too much dye for inserting a catheter or other medical implement into a patient may damage or distress the patient's kidneys. Using this technology, the location of the blood vessels can be located using the superimposed CT scan on the patient and with the increased contrast resolution of a CT scan 720 as compared to a 2D X-ray generated image 702. This technology may provide a real time guidance or a visualization (e.g., a road map) for a medical procedure. The X-ray generated image may allow the medical professional or user of the AR headset to see a catheter or other radiopaque tool in real time while the CT scan (i.e., image data set) may allow a medical professional to see more detailed anatomical features when correctly aligned. This process reduces the amount of dye in the patient and radiation used while a medical professional performs a medical procedure.

FIGS. 8B and 8C further illustrate that an image projection from the CT scan or the entire CT scan can stay aligned using the present technology regardless of the orientation of the mobile X-ray device (e.g., C-arm). For example, when a medical professional rotates a C-arm, then the bones or blood vessels are viewed from another orientation and the image projection from the CT scan 720 can be matched to the C-arm orientation. Optical codes on the C-arm and on the patient, enable the X-ray generated image 702 and CT scan data 720 to be aligned together. An automatic reconstruction of the CT scan 720 can be generated in the frontal, oblique, lateral or any projection as the mobile imaging device moves.

In another configuration, the system may start with the X-ray generated image and then automatically create the desired image projection from the CT scan (e.g., image data set). An image projection of the image data set may represent a slab of tissue that contains identifiable elements in the slab, such as the spine, the iliac crest, pelvis, etc. The X-ray generated image can also have corresponding identifiable anatomical elements (e.g., spine, iliac crest, bone, etc.). Accordingly, the image projection from the image data set may be selected based on a known anatomical element to be highlighted or operated on. Alternatively, the medical professional may select or highlight a specific anatomical structure (e.g., spine, vertebra, pelvis, etc.) and that may determine the projection that is generated.

The X-ray generated image can define an orientation and position for generating a useful projection from the image data set. The technology may automatically register the image visible and optical codes on the patient, mobile fluoroscopic device and the orientation and position of the X-ray generated image, and then the system may find the best fit projection from the CT image. In these examples of alignment, the bones become the internal registration system for the images and the image visible optical codes become the external registration system.

The thickness of the slab for an image projection taken from the image data set (e.g., CT scan) may be selected by the medical professional. In addition, the medical professional may determine the depth of the slab in the image data set in any direction. The location of the X-ray generated image being displayed with respect to the body of the person in the AR head set may also be determined. For example, the X-ray generated image may be displayed to appear outside the body of the person. Alternatively, the X-ray generated image may be displayed as being near to or adjacent to the image projection from the image data set as illustrated in FIG. 8B and FIG. 8C. In addition, the auto detection of a slab position or depth may be around specific bones, organs, depth of anatomy, estimated depth of anatomy, etc.

Figure 9A:
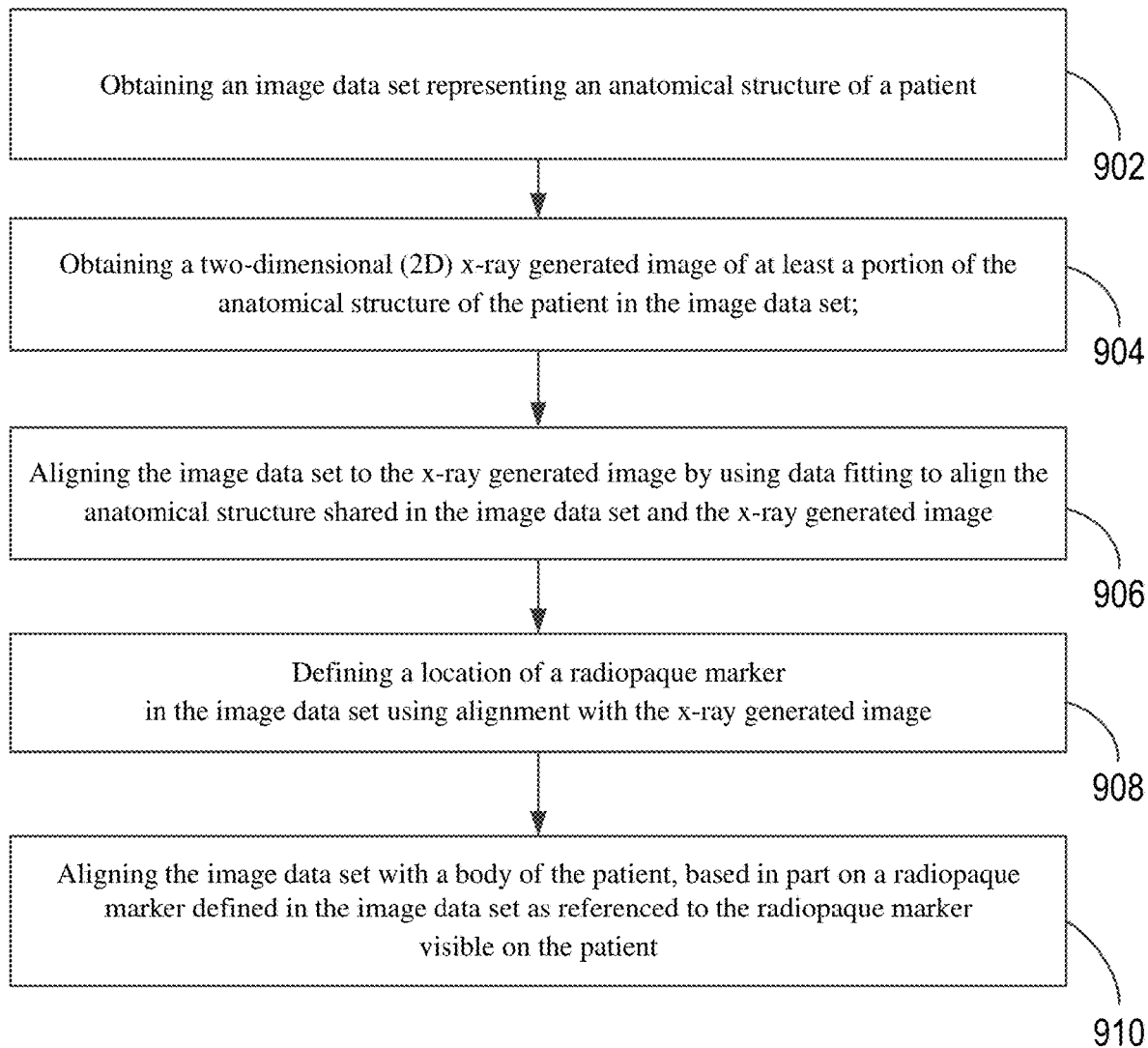
FIG. 9A is a flowchart of an example method of using an augmented reality headset to align an X-ray generated image to an image data set and then align the image data set to a body of a patient.

FIG. 9A is a flowchart of an example method of aligning an image data set with a body of a patient, and the image data set can be displayed using an augmented reality (AR) headset worn by a medical professional. In these and other embodiments, the method 900 may be performed by one or more processors based on one or more computer-readable instructions stored on one or more non-transitory computer-readable media.

The method may include obtaining an image data set representing an anatomical structure (e.g., bones, cartilage, skin, etc.) of a patient, as in block 902. For example, the image data set may be a CT scan or MRI scan that is captured as a maximum intensity projection (MIP) image. Similarly, a two-dimensional (2D) X-ray generated image of at least a portion of the anatomical structure of the patient in the image data set may be obtained, as in block 904.

Another operation may be aligning the image data set to the X-ray generated image by using data fitting to align the anatomical structure (e.g., bones, cartilage, skin, or organs) shared in the image data set and the X-ray generated image, as in block 906. The data fitting used between the two images may be: the difference, the square of the difference, best fit, a least squares best fit, a least squares best fit using the squares of the differences, curve fitting, regression analysis or another data fitting technique for fitting the bone or similar identifiable tissue clearly visible in the X-ray generated image with the same bone or tissue in the image data set. In one configuration, at least two X-ray generated images may be obtained to enable alignment in a depth direction using a radiopaque marker (i.e., an image visible marker) or image visible marker with the optical code.

The location of a radiopaque marker or radiopaque marker with an optical code in the image data set may be defined using alignment with the X-ray generated image, as in block 908. For example, the image visible marker or image visible markers with the optical code representing the radiopaque marker in the X-ray generated image that is aligned with the image data set may be copied to the image data set.

The image data set may then be aligned with a body of the patient, based in part on a radiopaque marker or radiopaque marker with an optical code defined in the image data set as referenced to the radiopaque marker or radiopaque marker with the optical code visible on the patient, as in block 910. The location of a center point (or other coordinate point in a 3D coordinate space) for the radiopaque marker on the body of the patient may be identified by computing a ray from an X-ray source through the center of the radiopaque marker in each of the at least two X-ray generated images and determining that the radiopaque marker lies at an intersection of both rays (i.e., triangulation). In addition, a point for a radiopaque marker on the body of the patient may be identified by computing a ray from an X-ray source through a center of the radiopaque marker in the X-ray generated image and determining that the radiopaque marker lies at an intersection of the ray and skin of the patient. Triangulation of rays may be used to identify image visible markers or image visible markers with optical codes that are not on the skin of the patient's body.

The optical code may be formed into material (e.g., metal or radiopaque material) of the radiopaque marker. In another configuration, the radiopaque marker may be made of metal and have an optical code (e.g., metallic ink on plastic or paper) affixed to the metal. The optical code may be: a linear bar code, a matrix two-dimensional (2D) bar code, a quick response (QR) code, or an AprilCode.

A further operation may be displaying the image data set or an image projection from the image data set as an overlay to the body of the patient, which is viewable through a lens of the AR headset. The alignment and merging of these multiple image aspects may be viewed through the AR headset. The X-ray generated image may optionally be displayed with the image data set using the AR headset to form a single graphical view as an overlay to the body of the patient that is viewable through a lens of the AR headset.

Figure 9B:
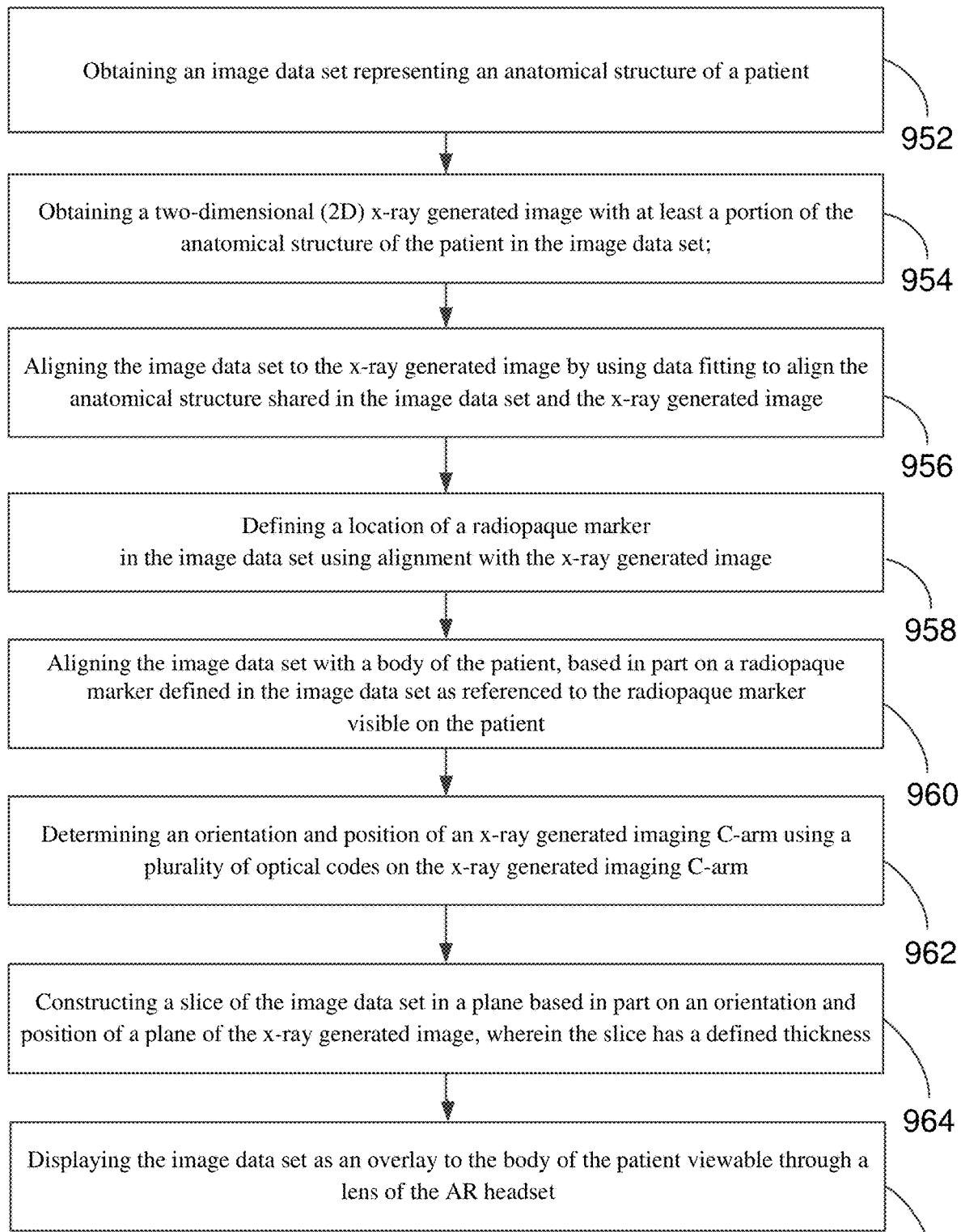
FIG. 9B is a flowchart of an example method of using an augmented reality headset to align an X-ray generated image to an image data set and then align the image data set to a body of a patient using a radiopaque marker with an optical code.

FIG. 9B is a flowchart illustrating another method for aligning an image data set, representing medical imaging of a patient, with a body of a patient using an augmented reality (AR) headset worn by a medical professional. In particular, this method is related use of a mobile X-ray imaging device and generation of a projection or slice of the image data set using the orientation of the mobile X-ray imaging device.

The method may include obtaining an image data set with an anatomical structure of the patient, as in block 952. For example, the image data set may be a CT scan or similar medical image captured as a maximum intensity projection (MIP) image. An X-ray generated image that includes at least a portion of the anatomical structure in the image data set may also be obtained, as in block 954.

Another operation is aligning the image data set to the X-ray generated image by using data fitting to align the anatomical structure that is shared between the image data set and the X-ray generated image, as in block 956. The data fitting may be a least squares best fit using the squares of the differences. With this alignment of the two images, a location of a radiopaque marker or radiopaque marker with an optical code can be defined in the image data set using alignment with the X-ray generated image, as in block 958. For example, the location of the radiopaque marker or radiopaque marker with an optical code may be copied from the X-ray generated image to the image data set. In one configuration, at least two X-ray generated images are used to enable alignment of the X-ray generated image with the image data set using the radiopaque marker.

A further operation may be aligning the image data set with a body of the patient. The alignment may be performed using a radiopaque marker or radiopaque marker with an optical code that is visible on the patient anatomy and the radiopaque marker or radiopaque marker with the image visible optical code may also defined in the image data set, as in block 960. An orientation and position of an X-ray imaging C-arm can be determined using a plurality of optical codes on the X-ray imaging C-arm, as in block 962. The X-ray generated image has been captured by the X-ray imaging C-arm and so the orientation and position of the X-ray generated image may also be known.

The orientation and position of the X-ray imaging C-arm may be used to construct a projection or slice of the image data set in a plane based in part on an orientation and position of a plane of the X-ray generated image, as in block 964. The projection or slice may also have a defined thickness in voxels or layers selected from the image data set. Finally, the slice and X-ray generated image may be displayed using the AR headset to form a graphical view as an overlay to the patient anatomy, as in block 966.

In an additional configuration, the present technology may be used for a simulation of a medical procedure. The patient's body or patient's anatomy may be simulated using simulation structures. The simulation structures may be plastic or cadaver bones covered with soft material (plastics and rubbers to represent tissues, arteries, etc.) or other simulation materials. The simulated anatomy may include an image visible marker or image visible marker with an optical code. Then the image data set for the patient on which a procedure is to be performed in the future may be aligned with the simulated anatomy.

The actual medical implements to be used in the procedure may also be included in the simulation and may be in the view of an AR headset. Similarly, a limited portion of the medical implement (e.g., just a handle of a trocar) may be used and a virtual tool in the simulated patient may be viewed. Additional overlays using real time fluoroscopy, ultrasound or other medical images captured in real time may also be used. Thus, the medical professional may perform the same functions described earlier but as a simulation in order to better understand the challenges, problems or other issues that may occur in an actual procedure that is planned. This simulation may also be used for training purposes.

The operations described for this technology may be performed in any order that provides the described alignment results. For example, the x-ray generated image may first be aligned to the patient using the image visible markers, then the image data set may be aligned to the x-ray generated image using the shared anatomical structures (e.g., bone) which simultaneously aligns the image data set to the patient as viewed through the AR headset.

Figure 10:
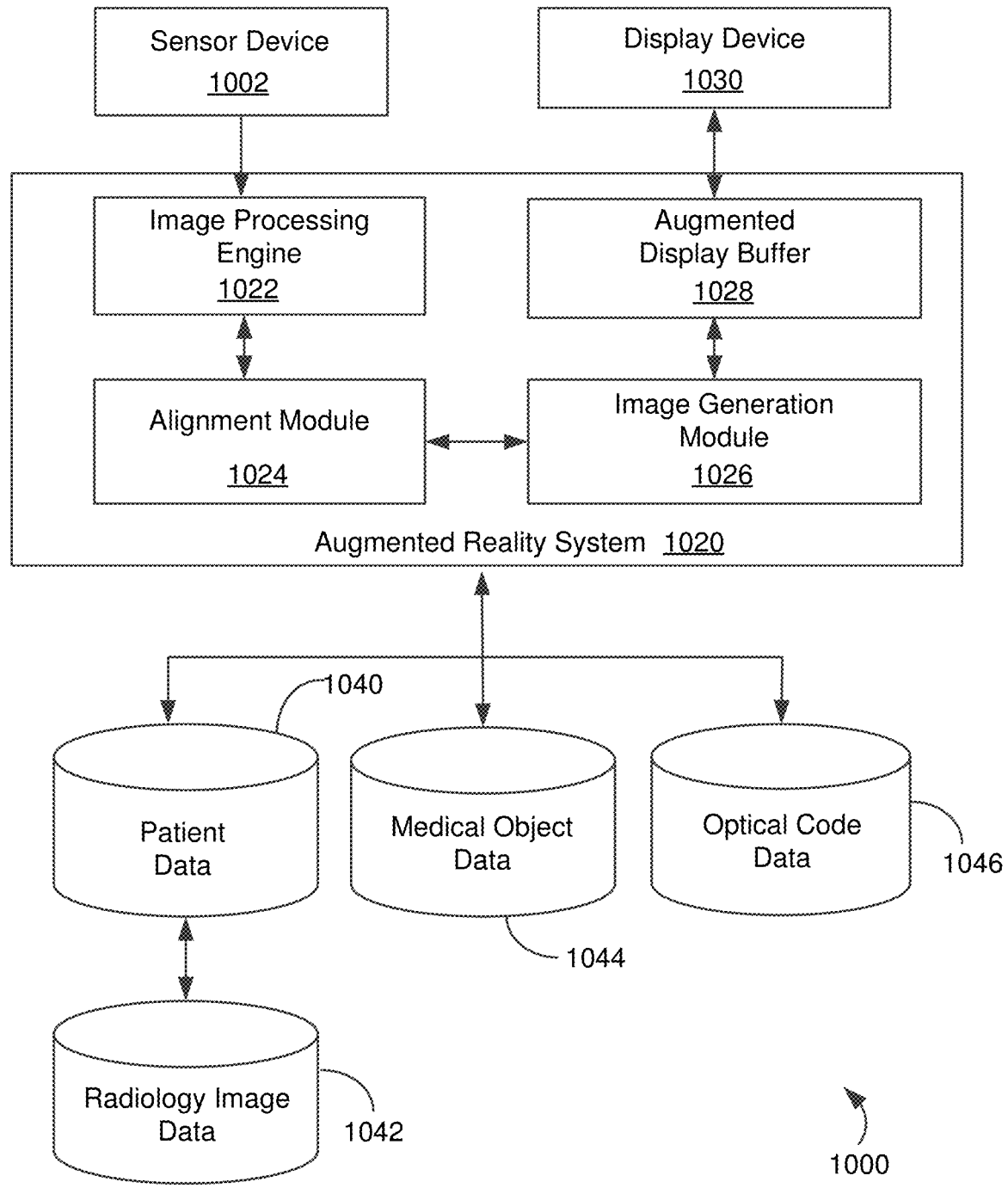
FIG. 10 illustrates an example computing system that may be used to align an image data set to the body of a patient.

FIG. 10 illustrates an example system that may be employed to align an image data set with a patient's body using image visible markers or image visible markers with optical codes, as viewed through the AR headset. The system 1000 may include a sensor device 1002 (e.g., camera, IR light, LIDAR and/or other sensor), an augmented reality system 1020, a display device 1030, and a plurality of databases. The system 1000 may also include one or more processors, a memory, a file system, a communication unit, an operating system, and a user interface, which may be communicatively coupled together. In some embodiments, the system 1000 may be, for example, a desktop computer, a server computer, a laptop computer, a smartphone, a tablet computer, an embedded computer, an AR headset, a VR headset, etc.

The sensor device 1002 can be configured to capture visible data, IR data, LIDAR data, etc. In one example, the sensor device 1002 may be used to capture visible or IR data during a medical procedure. The visible or IR data captured by the sensor device 1002 may include images of a body of a person (or a portion of a body), one or more medical implements (e.g., medical instruments, implants, and so on), image visible markers or image visible markers with optical codes, etc. The sensor device 1002 may transmit the captured imaging data to the augmented reality (AR) system 1020. The system may include surface sensors, optical sensors, infrared sensors, Lidar sensors or other sensors to detect and assist with mapping a real view or actual view detected by the AR system. Any object or surface may be detected for an operating theater, a patient, a room, physical geometry, medical implements, or any other physical surroundings or objects.

The augmented reality system 1020 may include an image processing engine 1022, an alignment module 1024, an image generation module 1026, and an augmented display buffer 1028. For example, the image processing engine 1022 receives the captured visible or IR image data from the sensor device 1002 and analyzes the visible or IR image data to identify one or more optical codes existing in optical code database 1046, objects or people in the visible or IR image data. A plurality of different techniques may be used to identify objects and images within the visible image data including but not limited to feature extraction, segmentation, edge detection, and/or object detection.

The image processing engine 1022 may also identify image visible markers or image visible markers with optical codes that may be affixed to bodies of patients within the image and medical implements within the visible or IR image data. Once the image processing engine 1022 identifies an optical code (e.g., an AprilTag, a bar code, a QR code, and so on), the image processing unit 1022 may access the optical code database 1046 to retrieve information associated with the optical code. In some examples, the optical code is associated with a particular patient, a particular procedure, or a particular object. The optical codes may be used to more accurately identify the position and orientation of a body, a fluoroscopic device, etc.

In some embodiments, the alignment module 1024 engages with the image processing engine 1022 to align a body of a person, an X-ray generated image, and/or an image data set with respect to each other. Once the position and orientation of the body of the patient are determined, the alignment controller 1026 can align any associated radiology images in the radiology image data 1042 with the body of the patient. In some examples, the radiology images are received from a radiology image database 1042 based on patient records in a patient record database 1040.

The image generation module 1026 can generate graphical data, virtual tools, a 3D surgical guide, 3D colorization or shading of a mass or organ, or highlighting of a mass, organ or target to display in a display device 1030 as layered on top of the body of the patient or a medical implement. In some examples, this information can be loaded into an augmented display buffer 1028. This information can then be transmitted to a display device 1030 of the AR headset (e.g., a waveguide or waveguide lenses) for display to a user.

In one example, the patient database 1040 includes a plurality of patient records. Each patient record can include one or more medical procedures to be performed on a patient. The patient records may also include notes, instructions or plans for a medical procedure. A patient record can also be associated with one or more radiology images (e.g., image data sets) in the radiology image database 1042. In another example, the medical object data 1044 includes information describing the medical implements, including medical instruments, implants, and other objects.

In some configurations, the augmented reality system may be located on a server and may be any computer system capable of functioning in connection with an AR headset or display device 1030. The server may be configured to communicate via a computer network with the AR headset in order to convey image data to, or receive data from, the AR headset.

Figure 11:
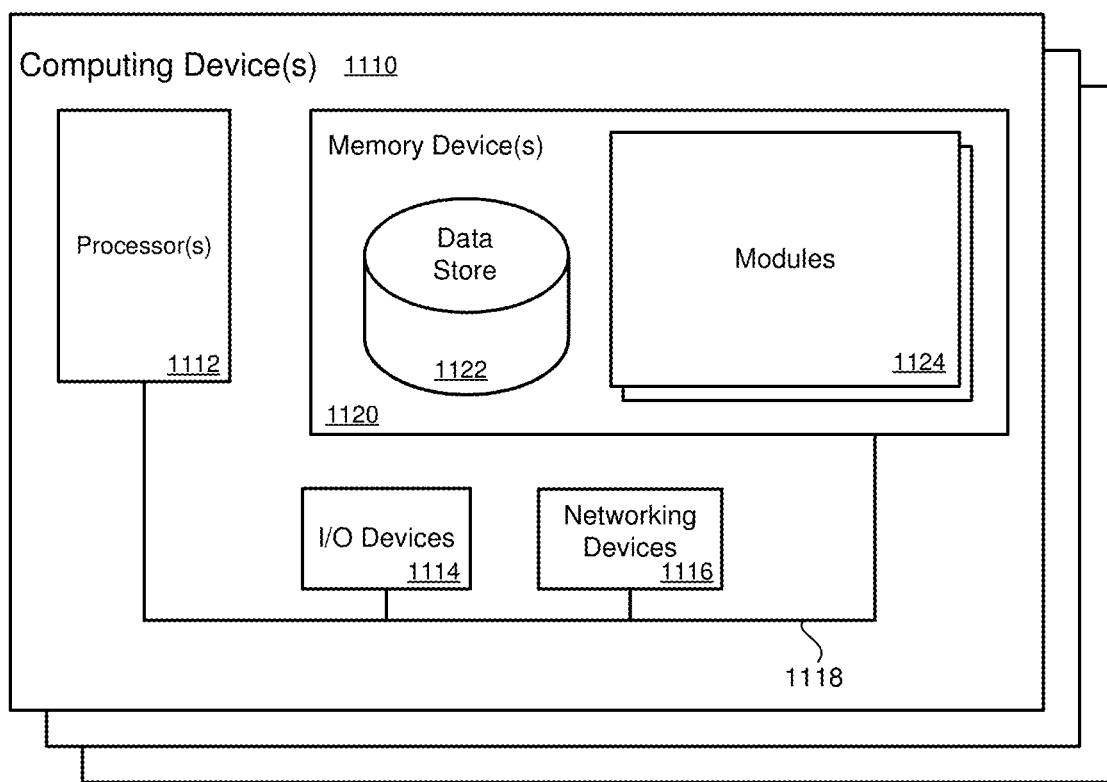
FIG. 11 is a block diagram illustrating an example of a computing system to process the present technology.

FIG. 11 illustrates a computing device 1110 on which modules of this technology may execute. A computing device 1110 is illustrated on which a high level example of the technology may be executed. The computing device 1110 may include one or more processors 1112 that are in communication with memory devices 1112. The computing device may include a local communication interface 1118 for the components in the computing device. For example, the local communication interface may be a local data bus and/or any related address or control busses as may be desired.

The memory device 1112 may contain modules 1124 that are executable by the processor(s) 1112 and data for the modules 1124. The modules 1124 may execute the functions described earlier. A data store 1122 may also be located in the memory device 1112 for storing data related to the modules 1124 and other applications along with an operating system that is executable by the processor(s) 1112.

Other applications may also be stored in the memory device 1112 and may be executable by the processor(s) 1112. Components or modules discussed in this description that may be implemented in the form of software using high programming level languages that are compiled, interpreted or executed using a hybrid of the methods.

The computing device may also have access to I/O (input/output) devices 1114 that are usable by the computing devices. An example of an I/O device is a display screen that is available to display output from the computing devices. Other known I/O device may be used with the computing device as desired. Networking devices 1116 and similar communication devices may be included in the computing device. The networking devices 1116 may be wired or wireless networking devices that connect to the internet, a LAN, WAN, or other computing network.

The components or modules that are shown as being stored in the memory device 1112 may be executed by the processor 1112. The term "executable" may mean a program file that is in a form that may be executed by a processor 1112. For example, a program in a higher level language may be compiled into machine code in a format that may be loaded into a random access portion of the memory device 1112 and executed by the processor 1112, or source code may be loaded by another executable program and interpreted to generate instructions in a random access portion of the memory to be executed by a processor. The executable program may be stored in any portion or component of the memory device 1112. For example, the memory device 1112 may be random access memory (RAM), read only memory (ROM), flash memory, a solid state drive, memory card, a hard drive, optical disk, floppy disk, magnetic tape, or any other memory components.

The processor 1112 may represent multiple processors and the memory 1112 may represent multiple memory units that operate in parallel to the processing circuits. This may provide parallel processing channels for the processes and data in the system. The local interface 1118 may be used as a network to facilitate communication between any of the multiple processors and multiple memories. The local interface 1118 may use additional systems designed for coordinating communication such as load balancing, bulk data transfer, and similar systems.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

The invention claimed is:

1. A method for aligning an image data set with a patient using an augmented reality (AR) headset, the method comprising:
obtaining an image data set and a two-dimensional (2D) X-ray generated image of an anatomical structure containing at least one visible marker;
aligning the image data set to the X-ray generated image by using data fitting to align the anatomical structure shared between the image data set and the X-ray generated image;
defining a location of the at least one visible marker in the image data set using the X-ray generated image; and
aligning the image data set with the patient, based in part on the at least one visible marker correlated to the image data set as referenced to the at least one visible marker that is seen on the patient through the AR headset.

2. The method as in claim 1, displaying the image data set as an overlay to a body of a patient viewable through a lens of the AR headset.

3. The method as in claim 1, wherein the at least one visible marker has an optical code with a known spatial relationship to at least one image visible marker and aligning the image data set with a patient is based in part on the optical codes of the at least one visible marker in the image data set referenced to the optical code of the at least one visible marker seen on the patient through the AR headset.

4. The method as in claim 1, wherein the visible marker can be detected on the patient using infrared light and an infrared sensor of the AR headset.

5. A method for aligning an image data set with a body of a patient, the image data set being displayed using an augmented reality (AR) headset, the method comprising:
obtaining an image data set representing an anatomical structure of a patient;
obtaining a X-ray generated image of at least a portion of the anatomical structure of the patient in the image data set and a radiopaque marker with an optical code;
aligning the image data set to the X-ray generated image by using data fitting to align the anatomical structure shared between the image data set and the X-ray generated image;
defining a location of the radiopaque marker with the optical code in the image data set using alignment with the X-ray generated image; and
aligning the image data set with a body of the patient, based in part on an optical code of a radiopaque marker defined in the image data set as referenced to the optical code of the radiopaque marker visible on the patient through the AR headset.

6. The method as in claim 5, further comprising displaying the image data set as an overlay to the body of the patient viewable through a lens of the AR headset.

7. The method as in claim 5, further comprising displaying the X-ray generated image using the AR headset to form a single graphical view as an overlay to the body of the patient viewable through a lens of the AR headset.

8. The method as in claim 5, wherein the anatomical structure is at least one of bones, cartilage, skin or organs identifiable in the X-ray generated image.

9. The method as in claim 5, wherein the data fitting is at least one of: a difference between images, a square of the differences, a best fit, a least squares best fit, a least squares best fit using the squares of the differences, curve fitting, or regression analysis.

10. The method as in claim 5, further comprising obtaining at least two X-ray generated images to enable alignment in a depth direction using the radiopaque marker with the optical code.

11. The method as in claim 10, further comprising identifying a point for the radiopaque marker on the body of the patient by computing a ray from an X-ray source through a center of the radiopaque marker in each of the at least two X-ray generated images and determining that the radiopaque marker lies at an intersection of both rays.

12. The method as in claim 5, identifying a point for a radiopaque marker on the body of the patient by computing a ray from an X-ray source through a center of the radiopaque marker in an X-ray generated image and determining that the radiopaque marker lies at an intersection of the ray and skin.

13. The method as in claim 5, wherein the optical code is formed into metal of the radiopaque marker.

14. The method as in claim 13, wherein the radiopaque marker is made of metal and has an optical code affixed to the metal.

15. The method as in claim 5, wherein the optical code is at least one of: a linear bar code, a matrix two-dimensional (2D) bar code, a quick response (QR) code, or an AprilCode.

16. The method as in claim 5, further comprising:
identifying a plurality of optical codes on an X-ray imaging C-arm;
determining an orientation of the X-ray imaging C-arm in a 3D coordinate space with respect to the AR headset or patient for which an X-ray generated image is captured; and
constructing at least one of a: slice, slab or 3D volumetric projection of the image data set in a plane that aligns with the orientation of a plane of the X-ray generated image in the 3D coordinate space at a defined thickness, which is viewable through the AR headset.

17. The method as in claim 16, wherein the slice, slab or 3D volumetric projection of the image data set is reconstructed immediately after the X-ray generated image is captured from the patient.

18. The method as in claim 5, wherein the image data set is a CT (computed tomography) image, MRI (magnetic resonance imaging), a 3D X-ray image, a Positron Emission Tomography (PET) image, a fluorescence modality, an Infrared Thermography (IRT) modality, 3D Mammography, or a Single-Photon Emission Computed Tomography (SPECT) scan modality, nuclear image or an ultrasound image.

19. The method as in claim 5, wherein the image data set is a CT scan that is captured as at least one of: maximum intensity projection (MIP) image, average intensity image, or minimum intensity image.

20. The method as in claim 5, wherein the X-ray generated image has a position and orientation defined with respect to the AR headset or the body of the patient.

21. A method for aligning an image data set, representing medical imaging of a patient, with a body of a patient using an augmented reality (AR) headset worn by a medical professional, the method comprising:
obtaining an image data set representing an anatomical structure in the patient;
obtaining an X-ray generated image of at least a portion of the anatomical structure in the image data set;

aligning the image data set to the X-ray generated image by using data fitting to align the anatomical structure that is shared in the image data set and the X-ray generated image;

defining a location of a radiopaque marker with an optical code in the image data set using alignment with the X-ray generated image;

aligning the image data set with a body of the patient, using an optical code of a radiopaque marker visible on the patient and the optical code of the radiopaque marker defined in the image data set;

determining an orientation and position of an X-ray imaging C-arm using a plurality of optical codes on the X-ray imaging C-arm, wherein the X-ray generated image was captured by the X-ray imaging C-arm;

constructing a slice of the image data set in a plane based in part on an orientation and position of a plane of the X-ray generated image, wherein the slice has a defined thickness; and displaying the slice and X-ray generated image to form a graphical view as an overlay to the patient using the AR headset.

22. The method as in claim 21, wherein the image data set is a CT scan captured as at least one of: a maximum intensity projection (MIP) image, an average intensity image, or a minimum intensity image.

23. The method as in claim 21, wherein the anatomical structure that is shared is at least one of bones, cartilage, skin, or organs visible in the X-ray generated image.

24. The method as in claim 21, wherein the data fitting is at least one of: a least squares best fit using the square of the difference, curve fitting, or regression analysis.

25. The method as in claim 21, further comprising using at least two X-ray generated images to enable alignment of the X-ray generated image with the image data set using the radiopaque marker.

26. The method as in claim 21, wherein the optical code is made of metal and has an optical code formed into the metal.

27. The method as in claim 21, wherein the optical code is made of metal and has an optical code affixed the metal.

28. The method as in claim 21, wherein the optical code is at least one of: a linear bar code, a matrix two-dimensional (2D) bar code, a quick response (QR) code, or an AprilCode.

29. A system for aligning medical imaging of a patient with a body of the patient, the medical imaging being displayed using an augmented reality (AR) headset worn by a medical professional, comprising:

at least one processor of the AR headset;

a memory device of the AR headset including instructions that, when executed by the at least one processor, cause the system to:

obtain an image data set and a two-dimensional (2D) X-ray generated image of an anatomical structure containing at least one image visible marker align the image data set to the X-ray generated image by using data fitting to align the anatomical structure that is shared between the image data set and the X-ray generated image;

define a location of an image visible marker with an optical code in the image data set using alignment with the X-ray generated image; and align the image data set with a body of the patient viewable through the AR headset, based in part on the image visible marker with the optical code visible on the patient as referenced to optical code of the image visible marker represented in the image data set.

30. The system as in claim 29, further comprising display the image data set using the AR headset to form an overlay to the body of the patient.

31. The system as in claim 29, wherein the data fitting is at least one of: a least squares best fit using square of the difference, curve fitting, or regression analysis.

32. The system as in claim 29, further comprising obtaining at least two X-ray generated images to enable alignment using the image visible marker.

* * * * *